(12) United States Patent
Mouget et al.

(10) Patent No.: US 7,960,969 B2
(45) Date of Patent: Jun. 14, 2011

(54) ELECTROMAGNETIC IMAGING METHOD AND DEVICE

(75) Inventors: Pierre Mouget, Sèvres (FR); Emmanuel Legendre, Houston, TX (US); Thilo Brill, Feucherolles (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 307 days.

(21) Appl. No.: 12/095,844

(22) PCT Filed: Nov. 28, 2006

(86) PCT No.: PCT/EP2006/011730
§ 371 (c)(1),
(2), (4) Date: Aug. 27, 2008

(87) PCT Pub. No.: WO2007/065667
PCT Pub. Date: Jun. 14, 2007

(65) Prior Publication Data
US 2009/0195244 A1     Aug. 6, 2009

(30) Foreign Application Priority Data
Dec. 9, 2005   (EP) .................................... 05292661

(51) Int. Cl.
*G01N 27/82* (2006.01)

(52) U.S. Cl. ................... 324/221; 324/225; 324/229
(58) Field of Classification Search .............. None
See application file for complete search history.

(56) References Cited

U.S. PATENT DOCUMENTS

| | | | |
|---|---|---|---|
| 4,292,588 A | | 9/1981 | Smith et al. |
| 4,546,314 A | * | 10/1985 | Minerbo et al. ............. 324/221 |
| 4,882,542 A | * | 11/1989 | Vail, III ........................ 324/368 |
| 5,043,668 A | * | 8/1991 | Vail, III ........................ 324/368 |
| 5,270,647 A | | 12/1993 | Beissner et al. |
| 6,392,421 B1 | | 5/2002 | Amini |

FOREIGN PATENT DOCUMENTS

EP          0816838          1/1998

* cited by examiner

*Primary Examiner* — Vinh P Nguyen

(57) ABSTRACT

An electromagnetic imaging apparatus and method for electromagnetically measuring physical parameters of a pipe CJ, CC by means of a plurality of measuring arrangement ZMA, MCMA, MonMa, ImMA comprising a plurality of transmitter coil ZTX, LFTX, DTX and a plurality of receiver coil ZRX1, ZR2, MRX, MC, PRX1, PRX2, PRX3, PRX4, PRX5, PRX6, PRX7, PRX8, PRX9, PRX10, PRX11, PRX12, PRX13, PRX14, PRX15, PRX16, PRX17, PRX18, the transmitter coils and receiver coils being associated so as to form the plurality of measuring arrangement, the plurality of measuring arrangement being adapted to be positioned into the pipe and displaced through the pipe, the physical parameters being measured for a plurality of position along the pipe.

18 Claims, 10 Drawing Sheets

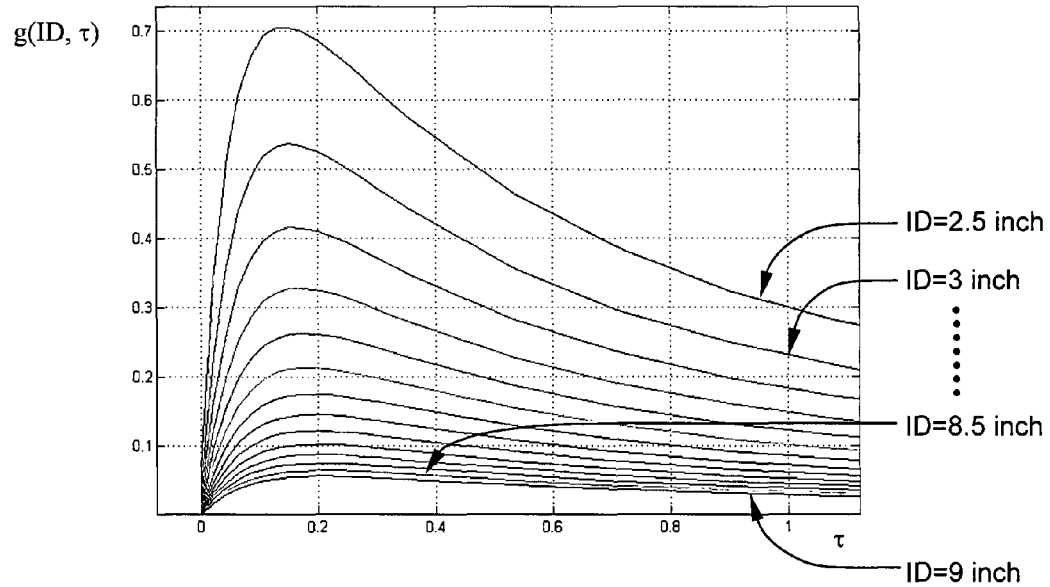
FIG. 8
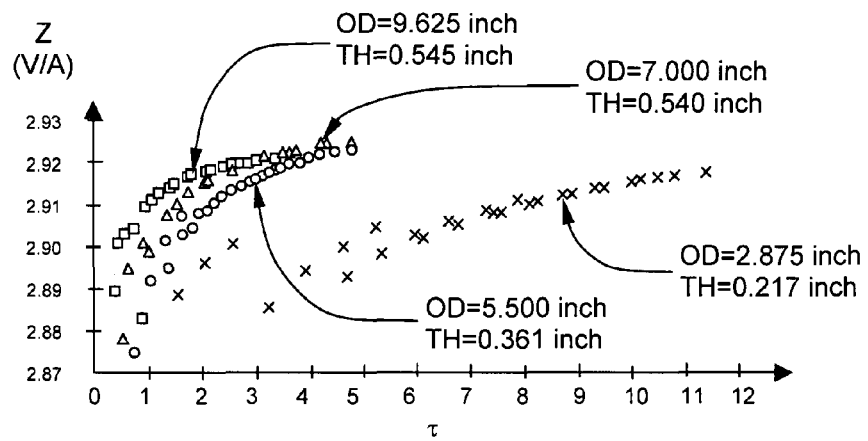
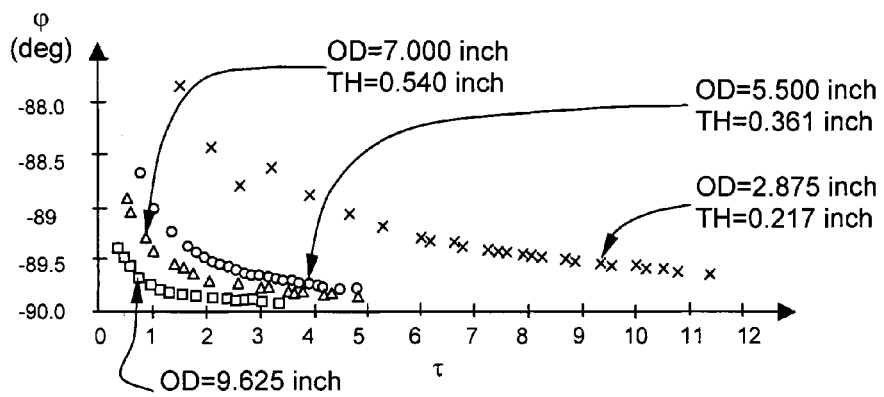
FIG. 9

1

ELECTROMAGNETIC IMAGING METHOD AND DEVICE

FIELD OF THE INVENTION

The invention relates to an electromagnetic imaging method and a device for measuring physical parameters of a pipe and providing an electromagnetic image of the pipe.

The invention is particularly well suited for implementation by a non-destructive electromagnetic inspection tool run into a ferromagnetic pipe.

The invention is particularly well designed for applications in the oilfield industry.

BACKGROUND OF THE INVENTION

FIG. 1 schematically shows a typical onshore hydrocarbon well location and surface equipments SE above a hydrocarbon geological formation GF after a well-bore WB drilling operation has been carried out, after a casing string CS has been run and after cementing operations have been carried out for sealing the annulus CA (i.e. the space between the well-bore WB and the casing string CS).

Typically, the casing string CS comprises a plurality of casing joints CJ, two casing joints being coupled together by a casing collar CC. The casing string function is to stabilize the well-bore.

The casing joint CJ is a length of steel pipe, generally around 13 m or 40 ft long with an externally threaded (male thread form) connection at each end. Casing joints are assembled to form a casing string of the correct length and specification for the well-bore in which it is installed.

The casing collar CC is an internally threaded (female thread form) short length of pipe used to connect two casing joints. The resulting connection must provide adequate mechanical strength to enable the casing string to be run and cemented in place. The casing collar must also provide sufficient hydraulic isolation under the design conditions determined by internal and external pressure conditions and fluid characteristics.

The casing may be made of plain carbon steel, stainless steel or other material in order to withstand a variety of forces, such as collapse, burst, and tensile failure, as well as chemically aggressive fluid. Nevertheless, in harsh environment, the casing may be subject to corrosion that may affect its functionality.

At this stage, well logging operation may be carried out. The well logging operation serves to measure various parameters of the hydrocarbon well geological formation (e.g. resistivity, porosity, etc. . . . at different depths) and in the well-bore (e.g. temperature, pressure, fluid type, fluid flowrate, etc. . . . at different depths). Such measurements are performed by a logging tool TL. Generally, a logging tool comprises at least one sensor (e.g. resistivity sonde, mechanical sonde, gamma ray neutron sonde, accelerometer, pressure sensor, temperature sensor, etc. . . . ) and measures at least one parameter. It may include a plurality of same or different sensors sensitive to one or more parameters. The logging tool is moved up and down in the borehole for gathering data about the various parameters by means of a cable LN. The cable may be a mechanical cable, an electrical cable or an electro-optical cable comprising a fiber line protected against potential harsh environment existing in the well-bore. The mechanical, electrical, or electro-optical cable transmits electrical signals or optical signals from the logging tool to the surface unit.

The logging tool may be deployed inside the well-bore by an adapted surface equipment SE that may include a vehicle SU and an adapted deploying system, e.g. a drilling rig DR or the like. Data related to the hydrocarbon geological formation GF or to the well-bore WB gathered by the logging tool TL may be transmitted in real-time to the surface, for example to the vehicle fitted with an appropriate data collection and analysis computer and software.

In particular, a logging tool TL may comprise an inspection tool.

FIG. 1 also schematically shows a magnified view of a portion of the cased well-bore, wherein the tool TL comprises an inspection tool. The inspection tool can detect the position, shape and dimension of a corrosion zone CR affecting a casing joint CJ'. The tool TL provides the measurements to the surface equipment through the connection line LN. By correlating this detection with depth measurements made by the tool TL, it is possible to run an appropriate tool down-hole for providing an appropriate remedial treatment (e.g. chemical treatment, patch, casing replacement or the like) for consolidating the corroded casing joint CJ'.

The inspection tool may be a mechanical caliper, an ultrasonic tool or an electromagnetic tool.

The mechanical caliper comprises a plurality of fingers for sensing the inner geometry of the casing. The mechanical calipers cannot be used for the determination of casing thickness, cannot distinguish non-metallic deposits on the casing from the metallic casing itself, and may initiate corrosion by scratching the casing surface.

The ultrasonic tool measures the time-of-flight of a sound-pulse between emission by the tool, reflections at the inner and outer surfaces of the casing and reception by the sound-wave detectors in the tool. They may measure the inside diameter as well as the thickness of the casing. The ultrasonic tool cannot be used when the casing transports a fluid mixture comprising a certain quantity of gas relatively to liquid, and provides deteriorated reflected signals in the presence of surface roughness which typically arise in corroded casing.

The electromagnetic tool is a non-destructive inspection tool. It may be based on either the flux-leakage principle, or the eddy-current principle or a combination thereof. The electromagnetic tool is insensitive to non-conductive deposits and can operate irrespective of the nature of the fluid mixture flowing into the casing.

The electromagnetic tool based on flux-leakage principle is typically used for the detection of localized damages in a ferromagnetic casing. This tool commonly subjects the casing to a strong static magnetic field. Due to the ferromagnetic nature of the casing, the magnetic return flux is mainly confined to the inside of the metal casing. In the presence of discontinuities in the metal, such as pits and holes caused by corrosion, the magnetic flux "leaks" out of the metal casing and may be detected with appropriate magnetic sensors such as coils, Hall probes, or magneto-resistive sensors. To allow for sufficiently sensitive and quantitative measurements, the flux-leakage based tool requires strong magnetic fields and good flux coupling into the inspected casing. This implies close proximity of the magnetic field source to the inner casing surface. The combinations of casings and tubings used in hydrocarbon wells often exhibit varying casing diameters that render the requirements of sufficiently strong and well-coupled magnetic flux difficult to maintain. Furthermore, magnetic flux-leakage tools are not suited for measurements of gradual thinning of the pipes.

The electromagnetic tool based on eddy-current principle is well-suited for the measurement of both, inside diameter and wall thickness of ferromagnetic metallic casing. This tool excites an alternating current in a coil transmitter adapted for inducing eddy-currents in the surrounding conductive casing and measures the induced voltage in a separate receiver coil. Alternatively, the tool may measure the impedance of the transmitter coil. The transimpedance is affected by the casing magnetic permeability ($\mu$), the electrical conductivity ($\sigma$) and the inner diameter of the nearby casing. In the case of electromagnetic tool where sufficiently low frequencies and large coil separations are used, measurement of the transimpedance is used to extract the ratio of wall thickness d of the casing to skin depth $\delta$, the so-called electromagnetic thickness d/$\delta$.

It is known that the results for inner diameter and wall thickness have to be corrected particularly for variations in magnetic permeability which can be significant, for instance due to mechanical stress or heat exposure. Document U.S. Pat. No. 4,546,314 proposes a first order correction method. However, in practice, it has been found that this first-order correction is commonly insufficient in order to achieve satisfactory measurements accuracy.

SUMMARY OF THE INVENTION

One goal of the invention is to propose a method and a device for measuring physical parameters of a pipe and providing an electromagnetic image of the pipe which overcomes the drawbacks of the prior art methods and devices.

According to a first aspect, the invention relates to an electromagnetic imaging method for electromagnetically measuring physical parameters of a pipe by means of a plurality of measuring arrangement comprising a plurality of transmitter coil and a plurality of receiver coil, the transmitter coils and receiver coils being associated so as to form the plurality of measuring arrangement, the plurality of measuring arrangement being adapted to be positioned into the pipe and displaced through the pipe, the physical parameters being measured for a plurality of position along the pipe. The method comprises the steps of:

a) determining a first value of an average ratio of magnetic permeability to electrical conductivity and a first value of an average inner diameter of the pipe,
b) determining an average electromagnetic thickness of the pipe,
c) determining a second value of the average ratio of magnetic permeability to electrical conductivity and a second value of the average inner diameter of the pipe according to excitation frequencies which are substantially lower than the excitation frequencies used to determine the first values,
d) determining a first image of a local electromagnetic thickness of the pipe and the pipe local defects,
e) discriminating the local defects at an inside perimeter of the pipe from the local defects at an outside perimeter of the pipe, and
f) forming a corrected first image of the pipe taking into account a position of the local defects.

According to another aspect, the method of the invention comprises the steps of:

a) forming an average casing properties measuring arrangement by:
   exciting a transmitter coil of the average casing properties measuring arrangement according to a first set of excitation frequency comprising at least two excitation frequencies,
   determining at least a first transimpedance between the transmitter coil and a receiver coil of the average casing properties measuring arrangement,
   calculating an average ratio of magnetic permeability to electrical conductivity and an average inner diameter of the pipe,
b) forming an average electromagnetic thickness measuring arrangement by:
   exciting a transmitter coil of the average electromagnetic thickness measuring arrangement according to a second excitation frequency,
   determining a second transimpedance between the transmitter coil and a receiver coil of the average electromagnetic thickness measuring arrangement,
   calculating an average electromagnetic thickness of the pipe,
c) forming a monitoring measuring arrangement by:
   exciting a transmitter coil of the monitoring measuring arrangement according to a third excitation frequency,
   determining a third transimpedance between the transmitter coil and a receiver coil of the monitoring measuring arrangement,
   calculating another value of the average ratio of magnetic permeability to electrical conductivity of the pipe and an average inner diameter of the pipe,
d) forming an imaging measuring arrangement by:
   exciting a transmitter coil of the imaging measuring arrangement according to a fourth excitation frequency,
   determining a plurality of transimpedance between the transmitter coil and a plurality of pad receiver coil of the imaging measuring arrangement,
   processing a first image of the local electromagnetic thickness of the pipe and the local defects of the pipe,
e) forming a discriminating measuring arrangement by:
   exciting a transmitter coil of the discriminating measuring arrangement according to a fifth excitation frequency,
   determining a plurality of transimpedance between the transmitter coil and a plurality of pad receiver coil of the discriminating measuring arrangement,
   discriminating the local defects at an inside perimeter of the pipe from the local defects at an outside perimeter of the pipe,
   processing a second image of the local ratio of magnetic permeability to electrical conductivity and a third image of the local radius of the pipe, and
   processing a corrected first image of the pipe electromagnetic thickness with a correction for local electromagnetic anomalies and the discriminated local defects of the pipe.

Optionally, the method may further comprise a step consisting in determining a second image of a local ratio of magnetic permeability to electrical conductivity and a third image of a local radius of the pipe.

Optionally, a calibration step may be further performed.

Advantageously, the first set of excitation frequencies and the fifth excitation frequency are chosen in a first range of frequencies, the second, third and fourth excitation frequencies are chosen in a second range of frequencies, the first range of frequencies being substantially higher than the second range of frequencies.

The first range of frequencies may be bounded between a first minimum frequency and a first maximum frequency, the first minimum frequency corresponding to satisfying the joint condition of a ratio of the pipe thickness to the pipe skin depth of 5 and a parameter tau of 1 and the first maximum frequency corresponding to satisfying the joint condition of the ratio of the pipe thickness to the pipe skin depth of 200 and the parameter tau of 0.02.

The second, third and fourth excitation frequencies may be chosen in a second range of frequencies bounded between a second minimum frequency and a second maximum frequency, the second minimum frequency corresponding to the ratio of the pipe thickness to the pipe skin depth of 0.2 and the second maximum frequency corresponding to the ratio of the pipe thickness to the pipe skin depth of 5.

The second and third excitation frequencies may be the same.

A first spacing between the transmitter and the receiver of the average electromagnetic thickness measuring arrangement, a second spacing between the transmitter and any of the pad receiver of the imaging measuring arrangement may be chosen so that a low frequency remote field eddy current regime occurs.

A third spacing between the transmitter and the receiver of the monitoring measuring arrangement may be chosen so that a low frequency near field eddy current regime occurs.

A fourth spacing between the transmitter and the receiver of the average casing properties measuring arrangement and a fifth spacing between the transmitter and any of the pad receiver of the discriminating measuring arrangement may be chosen so that a high frequency near field eddy current regime occurs.

A spacing between the transmitter coil and the receiver coil may be chosen so as to optimize the sensitivity to the pipe inner diameter.

According to another aspect, the invention relates to a computer program product for an electromagnetic imaging device, the computer program product comprising a set of instructions that, when loaded into a program memory of a main electronic arrangement coupled to the measuring arrangements, causes the main electronic arrangement to carry out the steps of the electromagnetic imaging method of the invention.

According to a further aspect, the invention relates to an electromagnetic imaging device for electromagnetically measuring physical parameters of a pipe, the electromagnetic imaging device being adapted to be positioned into the pipe, displaced through the pipe and coupled to a surface equipment, the electromagnetic imaging device comprising an average electromagnetic thickness measuring arrangement, an imaging measuring arrangement, a monitoring measuring arrangement, an average casing properties measuring arrangement and discriminating measuring arrangement, each measuring arrangement comprising a transmitter coil and at least one receiver coil, each measuring arrangement being coupled to an electronic arrangement comprising a transmitter circuit for exciting the transmitter coil by means of a transmitter current according to a plurality of excitation frequencies, and a receiver circuit for measuring a receiver voltage at the receiver coil. Each electronic arrangement is further coupled to a calculating module which implements the method of the invention.

Advantageously, the electromagnetic imaging device comprises a plurality of transmitter coil and a plurality of receiver coil positioned on a body of the electromagnetic imaging device, and a plurality of pad receiver coil, each pad receiver coil being positioned on an arm of a centralizer deployable against a pipe wall.

Each transmitter coil and receiver coil may comprise a wire wound-up on a body, the wound-up wire defining empty spaces impregnated with an oil, the oil being held in place by an over-molding material, a protection sleeve being over-molded on the wind-up wire and the over-molding material.

Each pad receiver coil may comprise a wire wound-up on an insert made of high magnetic permeability material, the wound-up wire defining empty spaces impregnated with an oil, the oil being held in place by an over-molding material, a protection sleeve being over-molded on the wind-up wire and the over-molding material.

The oil may be a perfluoropolyether oil. The over-molding material may be a mixture of perfluoropolyether with terminal silicon cross-linking groups. The protection sleeve may be made of semi-crystalline thermoplastic polyetheretherketone PEEK, or a plastic or a rubber material.

Advantageously, the plurality of electronic arrangement may be positioned within the body of the electromagnetic imaging device, the transmitter or receiver coil being coupled to the electronic arrangement by a cable crossing the body via a feed-through connector, the cable being sealed to the feed-through connector by a crimped area.

The invention enables determining an accurate electromagnetic image of the pipe. It is possible to determine the position of defects of the pipe with a great accuracy, in particular whatever the position of the defects on the inner or outer perimeter of the pipe.

The invention also enables determining the electromagnetic thickness of a pipe and a correction of the electromagnetic thickness measurements due to the changes in the electromagnetic properties of the casing, e.g. due to magnetic permeability anomalies. It also enables the determination of the inner casing diameter.

BRIEF DESCRIPTION OF THE DRAWINGS

The present invention is illustrated by way of example and not limited to the accompanying Figures, in which like references indicate similar elements:

FIG. 8 illustrates the modeling results of the calibrated measurement ratio as a function of the real and dimensionless variable τ for various inner diameters of the casing, measurements being made by the average casing properties measuring arrangement ZMA;

FIG. 9 illustrates measurement results of the transimpedance (top part) and the phase (bottom part) as a function of the real and dimensionless variable τ for various outer diameters of the casing and casing thickness pairs, measurements being made by the monitoring measuring arrangement MonMA;

DETAILED DESCRIPTION OF THE INVENTION

Figure 1:
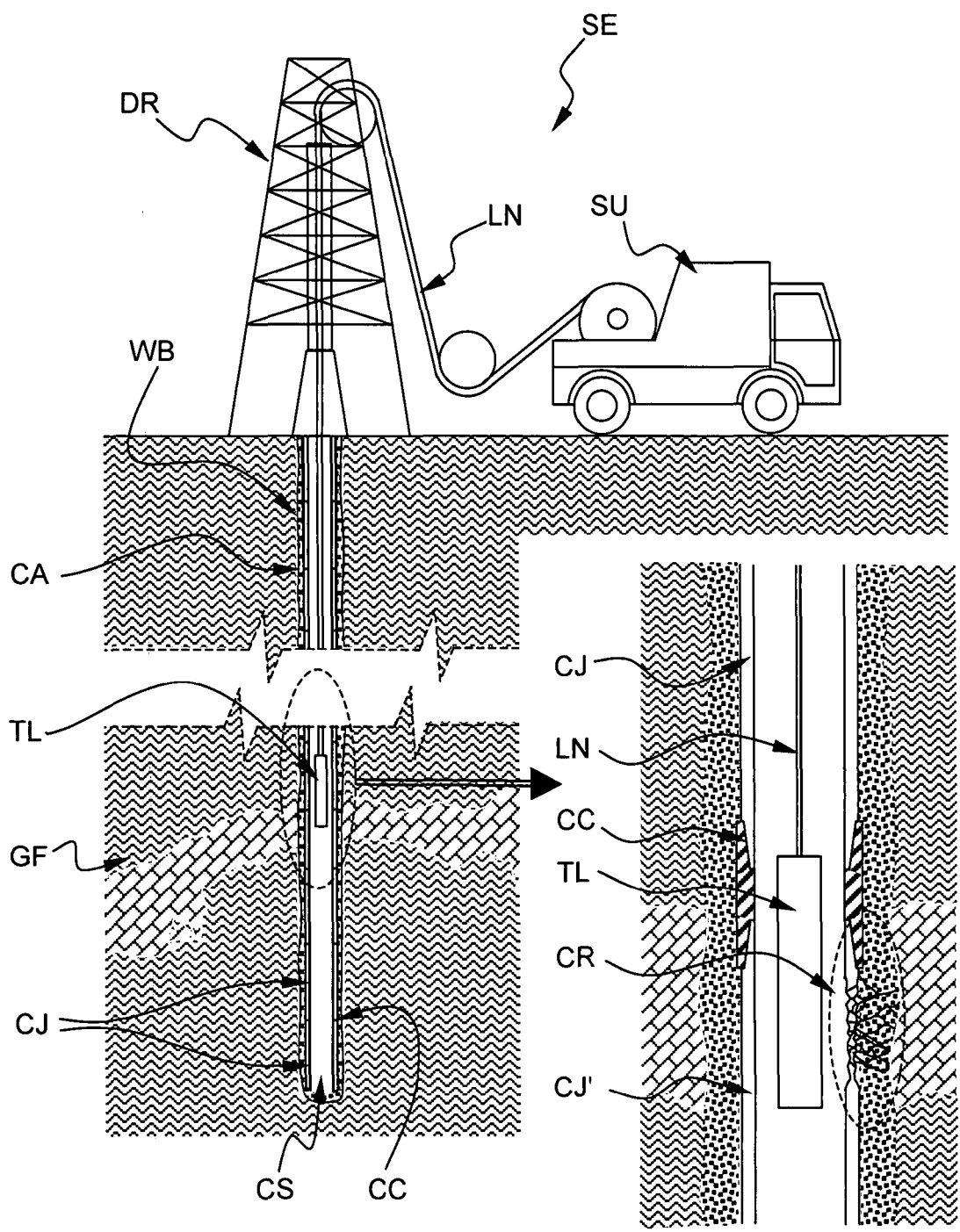
FIG. 1 schematically shows a typical onshore hydrocarbon well location and an enlarged portion of a zone where measurements are performed.
Figure 2:
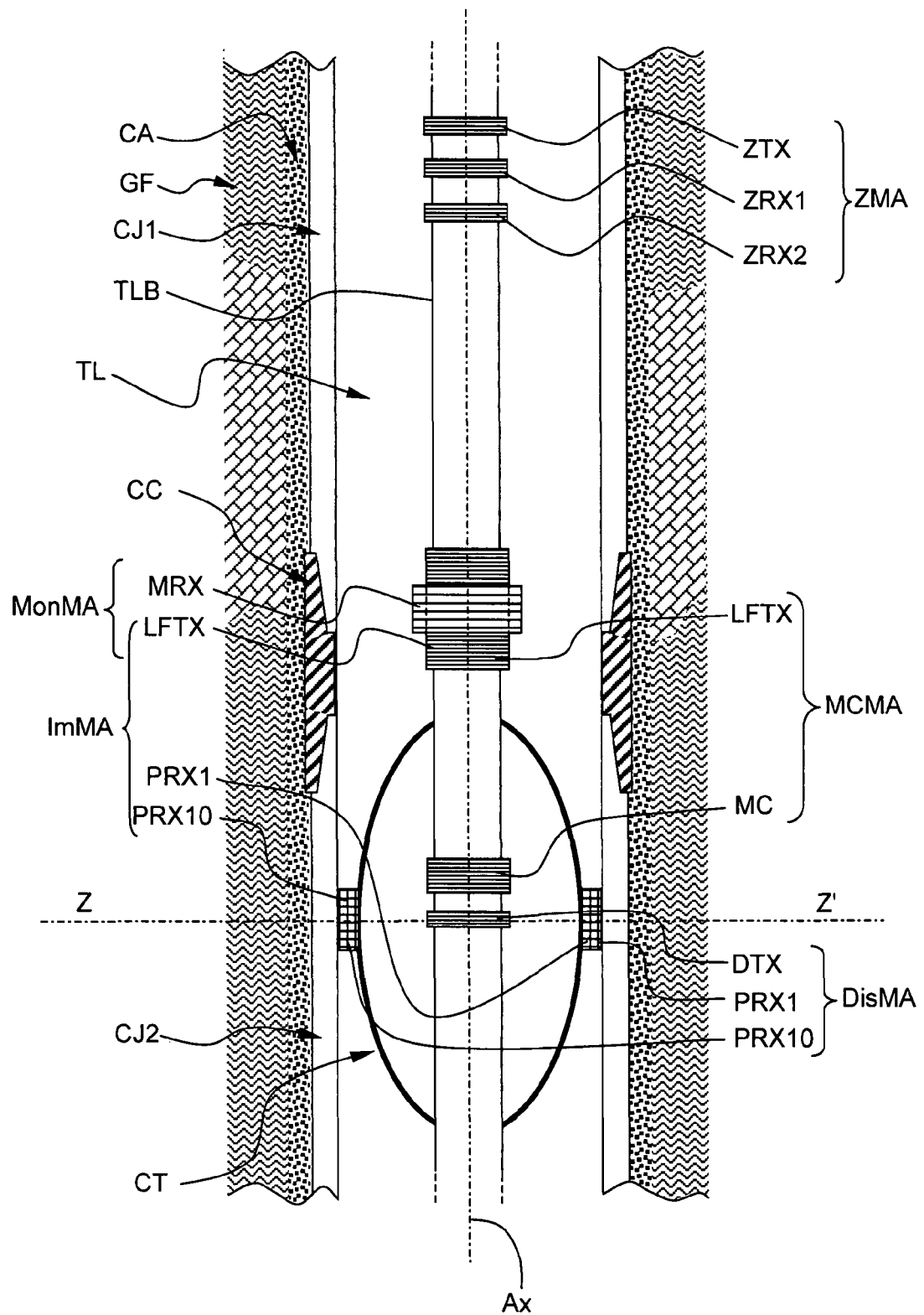
FIG. 2 is a cross section view into a casing schematically showing the electromagnetic tool of the invention.

FIG. 2 is a cross section view into a casing schematically showing the electromagnetic tool TL of the invention. The electromagnetic tool TL comprises five different measuring arrangements, each one being used to determine a particular physical parameter of the casing. Each measuring arrangement comprises a transmitter coil and at least one receiver coil. Each coil is characterized by its geometry, e.g. the number of turns of the coils, the winding radii and the wire gauges. Additionally, the relative position of a given transmitter-receiver pair is determined by the mutual spacing L along the tool axis Ax. A receiver coil may also be characterized by its radial and azimuthal coordinates. Some of the measuring arrangements may require for a given transmitter coil more than one receiver coil, situated at different spacings or different radial and azimuthal coordinates. The transmitter and receiver coils are wound on the tool body TLB.

More precisely, in the example of FIG. 2, the electromagnetic tool TL comprises an average casing properties measuring arrangement ZMA, an average electromagnetic thickness measuring arrangement MCMA, a monitoring measuring arrangement MonMA, an imaging measuring arrangement ImMA and a discriminating measuring arrangement DisMA.

The average casing properties measuring arrangement ZMA comprises a first transmitter coil ZTX, and a first receiver coil ZRX1 and a second receiver coil ZRX2. The receiver coils are spaced from the transmitter coil according to two different spacings.

The average electromagnetic thickness measuring arrangement MCMA comprises a second transmitter coil LFTX, and at least a third receiver coil MC.

The monitoring measuring arrangement MonMA comprises the second transmitter coil LFTX and a fourth receiver coil MRX. The receiver coil MRX is wound concentrically onto the transmitter coil LFTX.

The imaging measuring arrangement ImMA comprises the second transmitter coil LFTX, and a plurality of pad receiver coil PRX1, PRX2, PRX3, PRX4, PRX5, PRX6, PRX7, PRX8, PRX9, PRX10, PRX11, PRX12, PRX13, PRX14, PRX15, PRX16, PRX17 and PRX18.

The discriminating measuring arrangement DisMA comprises a third transmitter coil DTX and the plurality of pad receiver coil PRX1, PRX2, PRX3, PRX4, PRX5, PRX6, PRX7, PRX8, PRX9, PRX10, PRX11, PRX12, PRX13, PRX14, PRX15, PRX16, PRX17 and PRX18. The third transmitter coil DTX is located approximately below the pad receiver coils.

The transmitter ZTX, LFTX, DTX and the receiver ZRX1, ZRX2, MC coils are wind up on the tool body TLB. In particular, the coils are wind up on an insulator positioned in a groove machined in the tool body surface. The coil wires are soldered on electrical bulkhead connectors.

The electrical bulkhead connectors may comprise a glass sealed bulkhead located immediately below the coils. The bulkhead body is welded to the tool body and participates to the mechanical strength of the tool body. Each coil is internally connected to an electronic circuit via a mechanical extension supporting the connectors. Thus, the waste of volume around the coils is low and pressure compensation is easy to achieve.

Alternatively, the electrical bulkhead connectors may comprise semi-crystalline thermoplastic polyetheretherketone PEEK molded bulkheads. Preferably, the bulkheads are deported on one end of the tool body where there is a sufficient place to machine the bulkheads receiving cavities. The PEEK molded bulkheads enables improving mechanical robustness and reducing manufacturing cycles.

The empty spaces leaved between the coil wires and between the coil and the tool body are filled with oil. The oil is held in place by a flexible over-molding material. Preferably, the oil and the over-molding material have the following properties: electrical insulation, chemical stability and a density highest than fluids normally encountered in oil wells. For example the oil is made of a perfluoropolyether oil (e.g. Fomblin YR oil) and the over-molding material is made of a mixture of perfluoropolyether with terminal silicon cross-linking groups (for example a mixture of 3% of SIFEL 610 and 97% SIFEL 6070 commercialized by Shin-Etsu).

Preferably, a further protection sleeve made of PEEK is over-molded on the coils in order to create a barrier against gas migration. For example, the protection is 0.1 mm thick. Alternatively, a protection sleeve made of plastic may be over-molded on the coils. Any other protection material, e.g. rubber, may be used provided that it does not attenuate the magnetic field propagation. This is particularly true for the transmitters working at high frequencies (a few hundred Hertz). In case of low frequency, which is typically the case for transmitter working at a maximum of 70 Hz, the protection sleeve may be made of a metallic material.

As an alternative to the protection sleeve overmolding, it is possible to achieve a sealing by conventional O'rings or by using shape memory alloy rings (e.g. Nitinol) so as to hoop the protection onto the tool body. In this last case, the Nitinol ring is positioned over the PEEK protection sleeve, then extended to a larger diameter during its manufacturing, and finally the assembly is heated over a transformation point (around 60° C.) where it goes back to its initial diameter. The initial diameter is smaller than the PEEK protection sleeve diameter, thus generating an appropriate stress for the sealing.

Figure 3:
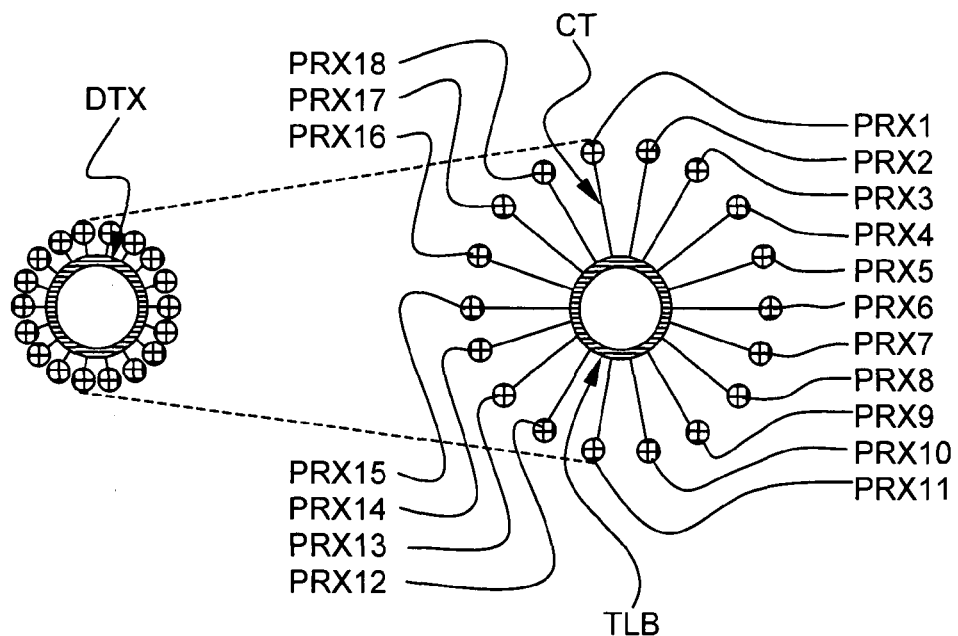
FIG. 3 is a cross section view into the electromagnetic tool of the invention along the plan ZZ' of FIG. 2 showing the centralizer in a retracted configuration (left part) and in a deployed configuration (right part), respectively.

FIG. 3 is a cross section view into the electromagnetic tool TL of the invention along the plan ZZ' of FIG. 2 showing the pad receiver coils. Each pad receiver coil PRX1, PRX2, PRX3, . . . and PRX18 is fitted onto an arm of a centralizer CT. The centralizer may be in a retracted configuration (left part of FIG. 3) and in a deployed configuration (right part of FIG. 3). The centralizer CT enables to position each pad receiver coil PRX1, PRX2, PRX3, . . . and PRX18 in close contact against the inner face of a casing joint or a casing collar as shown in FIG. 2 whatever the casing inner diameter. The centralizer is simple and reliable deploying system.

The arms can be either spring-loaded arms that permanently contact the pad receiver coils against the casing wall, or arms deployed by a motorization device. The motorized arms have the advantage of reducing the wear of the casing wall contacting side of the pad, the pads being deployed only during the active logging. Further, the motorized arms enables passing the various restrictions encountered in the well casing such as tubing shoe or gas lift mandrel.

Advantageously, each arm of the centralizer may comprise a double spring arrangement insuring a constant radial application force against the casing wall. The double spring arrangement comprises leaf spring providing centralization force in small casing diameters, and axial spring providing its highest centralization force in large casing diameters. Preferably, the external face of the leaf spring receives a wear resistant coating. The arms articulations may be flexible hinges. Conventional hinge may be used in order to increase the lateral rigidity of the arm and improve the angular positioning of the pad receiver coils. The arrangement of the arms and pad receiver coils enables accessing individually to every pad receiver coils and arms which is particularly suitable for maintenance. The tool body comprises a set of fixed and sliding rings receiving the arms extremities.

Each pad receiver coil PRX1, PRX2, PRX3, ... and PRX18 (not shown in details in FIGS. 2 and 3) may comprise a coil molded with an insert made of high magnetic permeability material (e.g. a ferro-magnetic insert) located in the center of the coil and two contact lugs. The coil wire is wind up on the insert and its ends soldered on the contact lugs by welding, thus ensuring a reliable mechanical and electrical contact. The pad receiver coils are connected to the tool body through high pressure bulkhead. In order to achieve a safe pressure barrier, for example if the pad receiver coil is pull out of the tool because of an incident during the logging operation, this bulkhead is backed by a second one mounted permanently on the tool body. Any technology (glass seal, brazed ceramic, plastic, etc. ... ) can be used for this second pressure barrier.

The pressure compensation of each pad receiver coil uses the same technique than the one hereinbefore described for the receiver and transmitter coils wound up directly onto the tool body. The pressure compensation is achieved through oil impregnation (e.g. Fomblin YR oil), material over-molding (e.g. SIFEL mixture) and protection sleeve. The protection sleeve may comprise a cover assembled to a body through a laser welding process. The laser welding process consists in contacting a first part (body or cover) made of a PEEK material at least partially transparent to the laser wavelength, and a second part (cover or body) made of a PEEK material absorbent at the laser wavelength (PEEK comprising Carbon black as additive). Then, the transparent first part is irradiated by the laser beam, causing the region of contact to melt. The laser welding process produces a continuous leak-proof weld, links the cover and the body together and enables protecting the receiver coil from well fluid contamination without using any O-ring arrangement.

Further, the pad receiver coil connector is also molded during the PEEK cover over-molding operation. The pad receiver coils comprises a continuous PEEK skin, preventing efficiently against moisture and gas migration inside the pad receiver coils. The molded connector on the sensor end acts as a high-pressure bulkhead.

The connection of the pad receiver coils to the electronic arrangement part in the tool body is achieved by a cable acting as a flexible electrical connection. Generally, as the inside of the tool body is maintained at room pressure while the outside is submitted to downhole pressure, the cable goes from the pad receiver coils to the inside of the tool body by means of a flexible feed-through connector. The flexible feed-through connector acts as a pressure barrier between the inside and outside of the tool body. Advantageously, the feed-through connector enables an important number of electrical connections in a given mechanical section, thus enabling deploying an important number of pad receiver coils from the tool.

FIG. 11 to 14 show various alternatives of feed-through connector adapted to the particular connection application for the tool of the invention.

Figure 11:
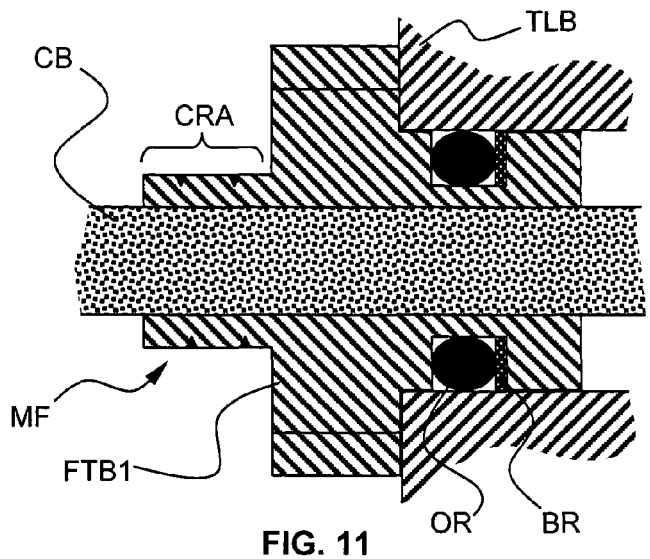
FIG. 11 to 14 show various alternatives of feed-through connector adapted to the particular connection of the transmitter and receiver coils of the tool of the invention.

FIG. 11 shows a crimped feed-through connector. The crimped feed-through connector comprises a feed-through body FTB1 which is partially inserted in a tool body TLB hole. The feed-through body FTB1 comprises a shoulder that comes into abutment with the toll body TLB outside surface. A O-ring OR and a backup ring BR are positioned in a seal groove of the feed-through body FTB1 and contact the tool body TLB hole. Thus, the feed-through body FTB1 is maintained in place into the tool body TLB hole while sealing is ensured between the tool body and the feed-through body. An extending portion of the feed-through body FTB1 extends outwardly from the tool body TLB. The cable CB goes through a feed-through body FTB1 central hole. The cable and the extending portion of the feed-through body FTB1 are crimped along a circumferential area CRA so as to form a metallic ferrule MF. Thus, the cable CB is maintained in place into the feed-through body FTB1 hole while sealing is ensured between the cable and the feed-through body.

Figure 12:
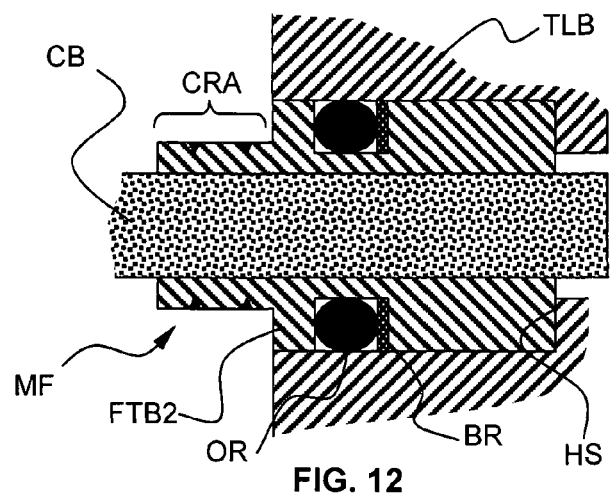

FIG. 12 shows an alternate crimped feed-through connector. According to this alternative, the feed-through body FTB2 does not comprise any shoulder. The hole of the tool body comprises a first portion having a first diameter and a second section having a second diameter, thus defining a hole shoulder HS. The feed-through body FTB2 is inserted in the tool body TLB hole and abuts against the hole shoulder HS. According to this alternative embodiment, only the metallic ferrule MF protrudes over the tool body.

The crimped circumferential area CRA of the crimped feed-through connector or the alternate crimped feed-through connector is manufactured by means of a roller pressed against the ferrule and moved around the ferrule. Advantageously, the cable is crimped in several locations in order to relieve the stress caused by the hydrostatic pressure progressively. Advantageously, the crimping circumferential area CRA provides an autoclave effect (i.e. increasing of the contact pressure while the well pressure increases) that increases the crimping force with the pressure while minimizing the average stress in the ferrule.

Figure 13:
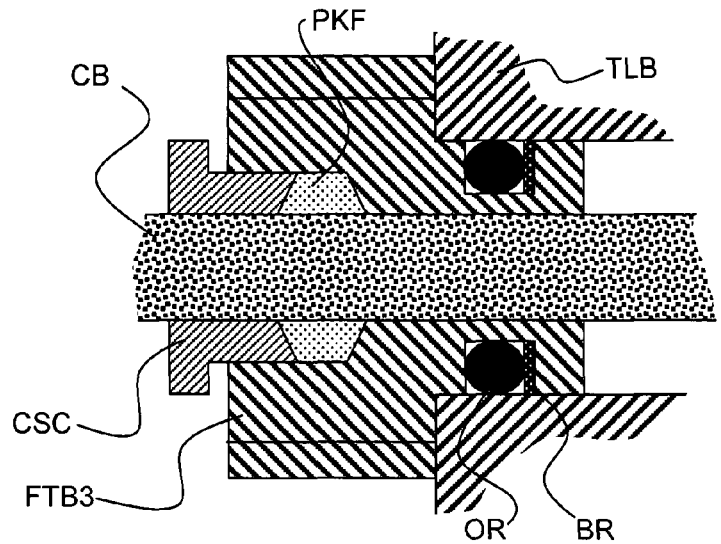

FIG. 13 shows a screwed ferrule type feed-through connector. This feed-through connector is an alternative to the crimped feed-through connector of FIG. 12. The feed-through body FTB3 further comprises a recess in the extending portion of the feed-through body FTB3 extending outwardly from the tool body TLB. A biconic ferrule PKF is inserted into the recess and maintained in place trough a compression screw CSC. Preferably, the biconic ferrule PKF is made of PEEK. The compression screw CSC squeezes the biconic ferrule PKF against the cable CB, thus enabling a sealing even with cables not perfectly cylindrical.

The PEEK material is well adapted for its chemical and mechanical performances in oil well environment. In particular, PEEK material has a low creeping rate which insures a substantially constant performance of the feed-through connector during the lifetime of the tool.

Figure 14:
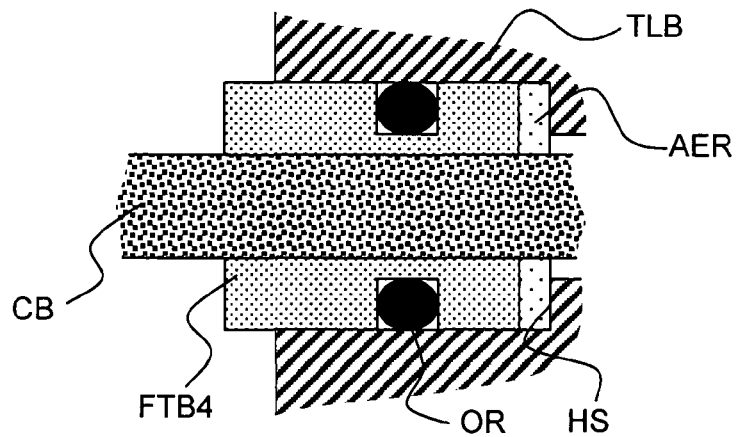

FIG. 14 shows an over-molded feed-through connector. The hole of the tool body TLB comprises a first portion having a first diameter and a second section having a second diameter, thus defining a hole shoulder HS. An anti-extrusion ring AER, e.g. a metal washer, is mounted into the hole and abuts on the shoulder.

A feed-through body FTB4 is over-molded directly on the cable CB. The bounding between the cable and the over-molded feed-through body provides the sealing between the cable CB and the feed-through body FTB4. The feed-through body FTB4 and the cable are inserted in the tool body TLB hole. The feed-through body FTB4 comes into abutment with the anti-extrusion ring AER. The feed-through body FTB4 comprises a seal groove in which a O-ring OR is positioned in order to contact the tool body TLB hole. Thus, the feed-through body FTB4 is maintained in place into the tool body TLB hole while sealing is ensured between the tool body and the feed-through body.

The over molding material can be virgin PEEK. Alternatively, the over molding material may PEEK reinforced with glass or carbon which enables improving the mechanical performances, e.g. in order to withstand pressure stress.

Alternatively, the over-molded feed-through connector may comprise an additional crimped ferrule (not shown) in a section bathed into the fluid flowing inside the casing. This alternative enables improving the sealing along the cable length.

Figure 15:
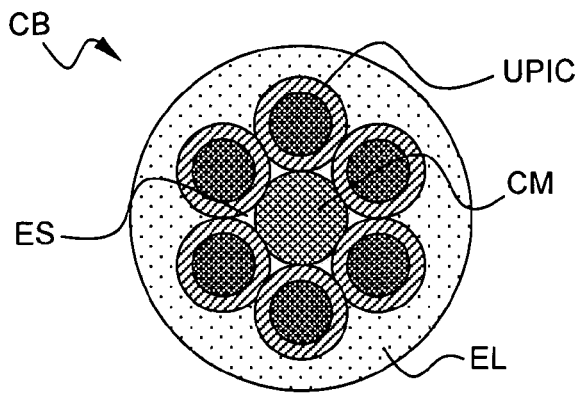
FIGS. 15 and 16 show a cable used with the feed-through connector of FIG. 11 to 14.
Figure 16:
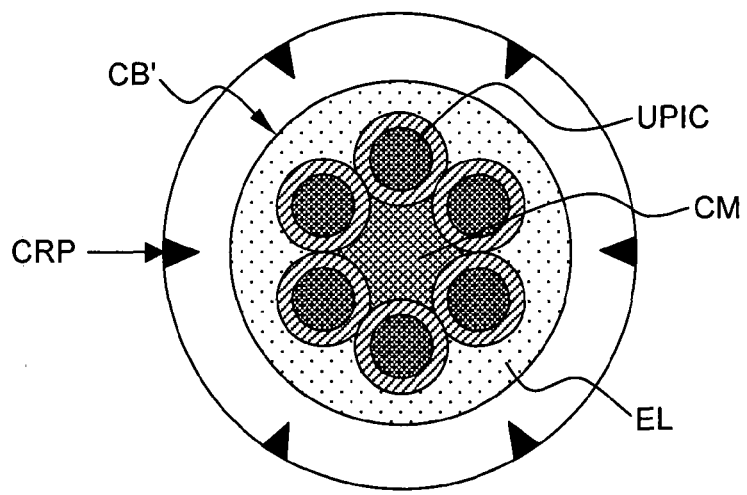

FIGS. 15 and 16 show a cable before CB and after CB' crimping process, respectively. The cable is used to couple the coils to the electronic arrangement parts through the feed-through connector shown in FIG. 11 to 14.

As an example, the cable is made of six unbraided conductors UPIC spirally wrapped over a central mandrel CM. For example, the conductors are made of copper. Advantageously, the conductors are housed in an extruded PEEK layer EL. The layer EL forms a continuous external surface providing a sealing. The central mandrel can be either a conductor or a plain cylindrical piece of PEEK or any other supporting material. FIG. 16 shows the cable CB' after a crimping process. The crimping results in a deformation collapsing the empty spaces ES between the individual conductors UPIC and the central mandrel CM. The crimping may be provided according to any of the hereinbefore described embodiment of FIG. 11 to 14. The crimping provides a determined force so as to retain the cable from sliding in the ferrule when exposed to the hydrostatic pressure. The crimping also provides the sealing between the cable and the ferrule.

Alternatively, the stress generated by the crimping can be controlled and reduced by using other types of cable, e.g. with less empty space or no empty space at all.

The flexible feed-through connection regroups in a single embodiment the functions of a standard high-pressure electrical multi-pin feed-through, the cable harness running on pressure side and air side and optionally the needed electrical connectors to electronic arrangement, sensors or equipment harness.

Further, the flexible feed-through connection enables increasing the number of electrical connections in a given section passing through the tool body towards the coils, in particular the pad receiver coils. This is particularly advantageous in order to increase the number of pad receiver coils deployed from the tool and, thus, to improve accuracy of the tool. The flexible feed-through connection has a very limited footprint.

Figure 4:
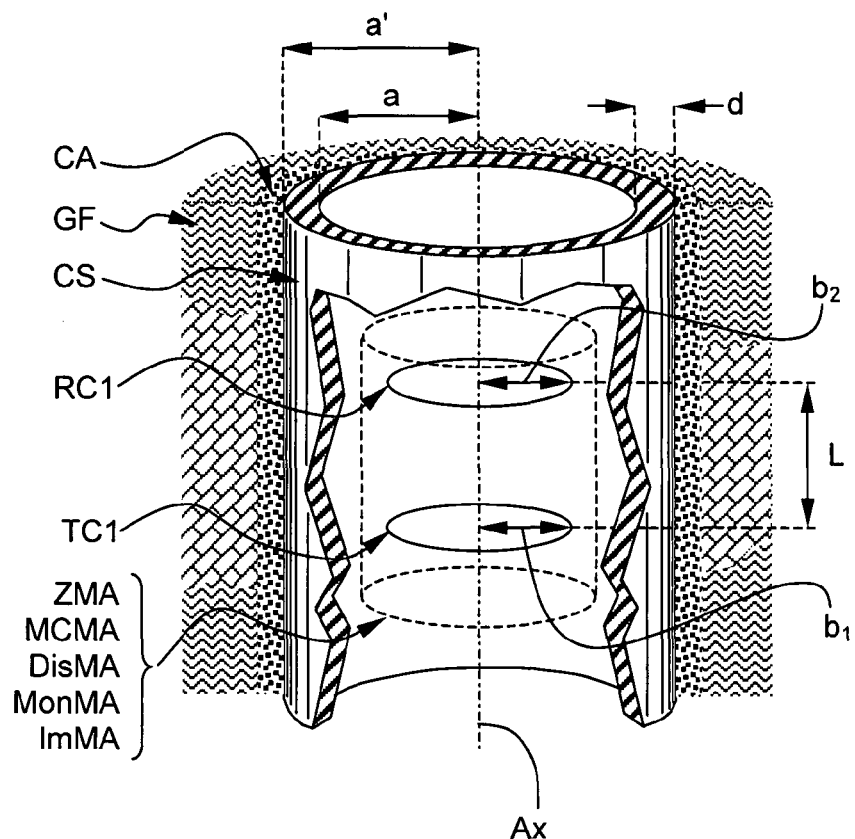
FIG. 4 is a cross section view into a casing schematically showing an electromagnetic measuring arrangement of the electromagnetic tool of invention shown in FIG. 2.

FIG. 4 illustrates, in a highly diagrammatic manner, the measuring principle of one of the measuring arrangement (either the measuring arrangement ZMA, MCMA, DisMA, MonMA or ImMA). The measuring arrangement comprises a first coaxial coil TC1 and a second coaxial coil RC1. The first coaxial coil TC1 is a transmitter coil having a radius $b_1$. The second coaxial coil RC1 is a receiver coil having a radius $b_2$.

It is to be noted that for the imaging measuring arrangement ImMA the receiver coils are ex-centered. The transmitter coil is spaced from the receiver coil by a spacing L. Although, each coil is represented as an infinitesimal current loop, it will be apparent for a person skilled in the art that each coil may be a finite size coil. For example, each coil may be constructed by the superposition of individual current loops and comprises a determined number of turns. Both coils are coaxial to the central axis Ax of the casing, except for the pad receiver coils which are ex-centered from the transmitter coil.

The measuring arrangement is shown inserted within a cemented casing CS.

The casing CS is characterized by its electromagnetic properties, namely a casing magnetic permeability $\mu_2$, a casing electrical conductivity $\sigma_2$ and a casing permittivity $\epsilon_2$. The casing CS is also characterized by its geometry, namely a hollow cylindrical shape. The casing is characterized by an inside radius a and an outside radius a'. The wall thickness d of the casing corresponds to the difference between the outside radius and the inside radius (i.e. d=a'−a).

The medium inside the casing is characterized by its electromagnetic properties, namely an inside medium magnetic permeability $\mu_1$, an inside medium electrical conductivity $\sigma_1$ and an inside medium permittivity $\epsilon_1$. The medium inside the casing may be a multiphase fluid mixture made of, for example, oil, gas and water.

The medium outside the casing is characterized by its electromagnetic properties, namely an outside medium magnetic permeability $\mu_3$, an outside medium electrical conductivity $\sigma_3$ and an outside medium permittivity $\epsilon_3$. The medium outside the casing is the geological formation GF separated from the casing CS by the cemented annulus CA.

It is to be noted that the permittivity will be neglected hereinafter because in the frequency range considered for the various measurements, the displacement currents in the Maxwell's equations are smaller than the conductive currents.

Advantageously, all the transmitter coils and receiver coils are solenoids with axes parallel or identical to the tool axis Ax. Receiver coils may alternatively be solid state transducers such as Hall-Effect sensors, magnetoresistive sensors or other magnetic field sensors.

The Tables 1 and 2 indicate some specification examples of transmitter coils and receiver coils of the tool shown in FIG. 2, respectively, and also the typical signal levels of transmitter coils currents and receiver coils voltages. In the following tables, the "mean radius" is the average value of the inner and outer coil diameter, the "rms signal level" is the root mean square signal level, the DC resistance is the resistance of the coil measured in direct current, and all values are given at a temperature of 20° C.

TABLE 1

| Transmitter coil type | Number of coils | Length [inch] | Mean radius [inch] | Turns | DC resistance [Ohm] | rms signal level [A] |
| --- | --- | --- | --- | --- | --- | --- |
| ZTX | 1 | 0.25 | 0.74 | 550 | 22 | 0.03 @ 500 Hz |
| LFTX | 1 | 14 | 0.76 | 7550 | 61 | 0.5 @ 35 Hz |
| DTX | 1 | 2 | 0.53 | 200 | 1.8 | 0.03 @ 10 kHz |

TABLE 2

| Receiver coil type | Number of coils | Length [inch] | Mean radius [inch] | Turns | DC resistance [Ohm] | rms signal level [V] |
|---|---|---|---|---|---|---|
| ZRX1 ZRX2 | 2 | 0.25 | 0.74 | 550 | 22 | $1.2\ 10^{-2}$ @ 500 Hz |
| MC | 2 | 3 | 0.56 | 9275 | 7035 | $10^{-3}$ @ 35 Hz |
| MRX | 1 | 2 | 0.94 | 830 | 264 | 3 @ 35 Hz |
| PRX1 ... PRX18 | 18 | 0.4 | 0.083 | 4500 | 516 | $10^{-5}$ @ 35 Hz |

Figure 5:
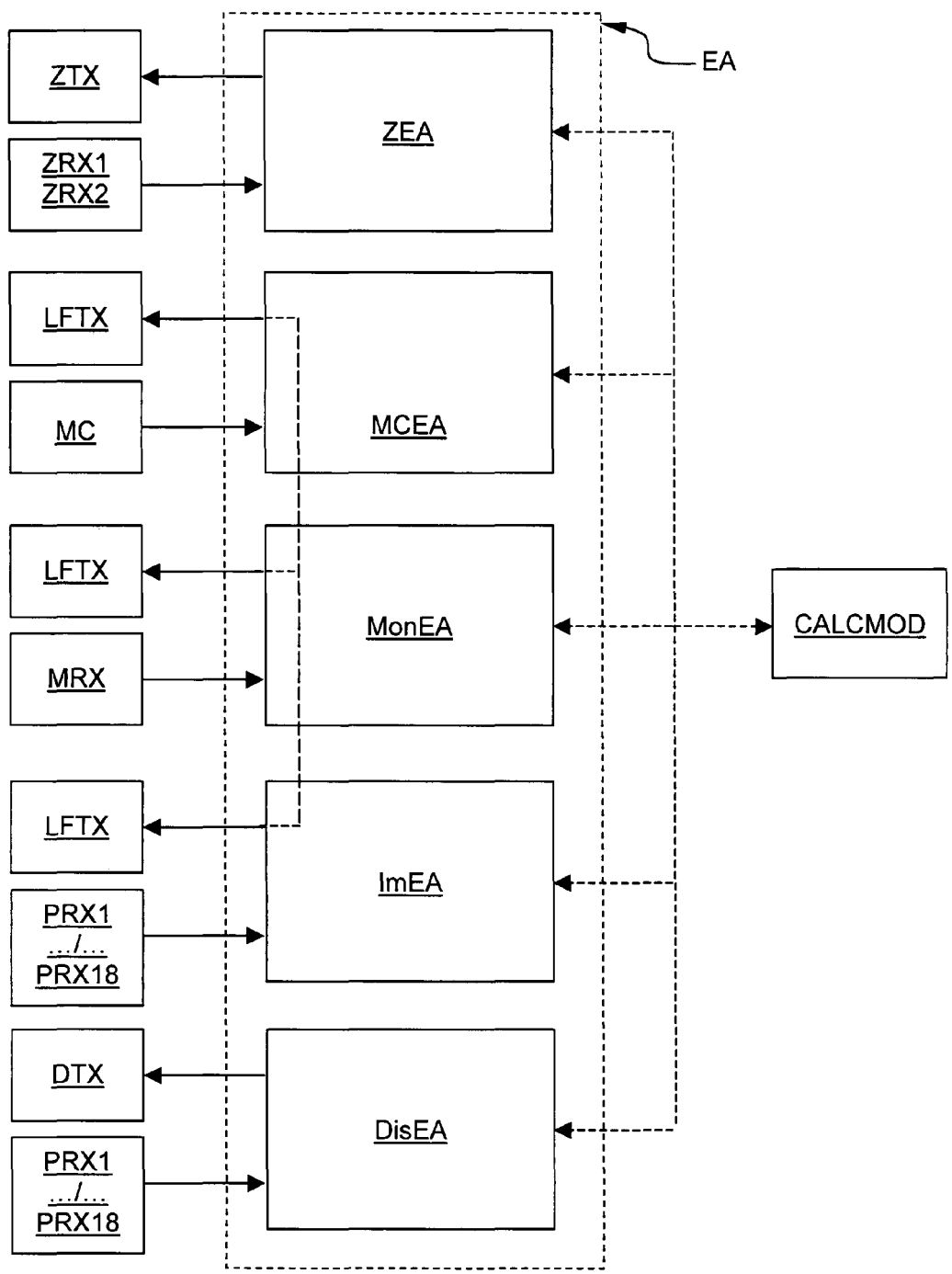
FIG. 5 is a block diagram schematically illustrating a main electronic arrangement associated with the electromagnetic tool shown in FIG. 2.

FIG. 5 is a block diagram schematically illustrating a main electronic arrangement EA associated with the electromagnetic tool. The main electronic arrangement EA comprises a first electronic arrangement part ZEA, a second electronic arrangement part MCEA, a third electronic arrangement part MonEA, a fourth electronic arrangement part ImEA and a fifth electronic arrangement part DisEA. The first electronic arrangement part ZEA is coupled to the first transmitter coil ZTX, the first receiver coil ZRX1 and the second receiver coil ZRX2. The second electronic arrangement part MCEA is coupled to the second transmitter coil LFTX and the third receiver coil MC. The third electronic arrangement part MonEA is coupled to the second transmitter coil LFTX and the fourth receiver coil MRX. The fourth electronic arrangement part ImEA is coupled to the second transmitter coil LFTX and the plurality of pad receiver coil PRX1, PRX2, PRX3, PRX4, PRX5, PRX6, PRX7, PRX8, PRX9, PRX10, PRX11, PRX12, PRX13, PRX14, PRX15, PRX16, PRX17 and PRX18. The fifth electronic arrangement part DisEA is coupled to the third transmitter coil DTX and the plurality of pad receiver coil PRX1, PRX2, PRX3, PRX4, PRX5, PRX6, PRX7, PRX8, PRX9, PRX10, PRX11, PRX12, PRX13, PRX14, PRX15, PRX16, PRX17 and PRX18. Each electronic arrangement part ZEA, MCEA, DisEA, MonEA and ImEA is further coupled to a calculating module CALCMOD. Advantageously, the main electronic arrangement EA and the electronic arrangement parts are fitted within the tool TL.

Figure 6:
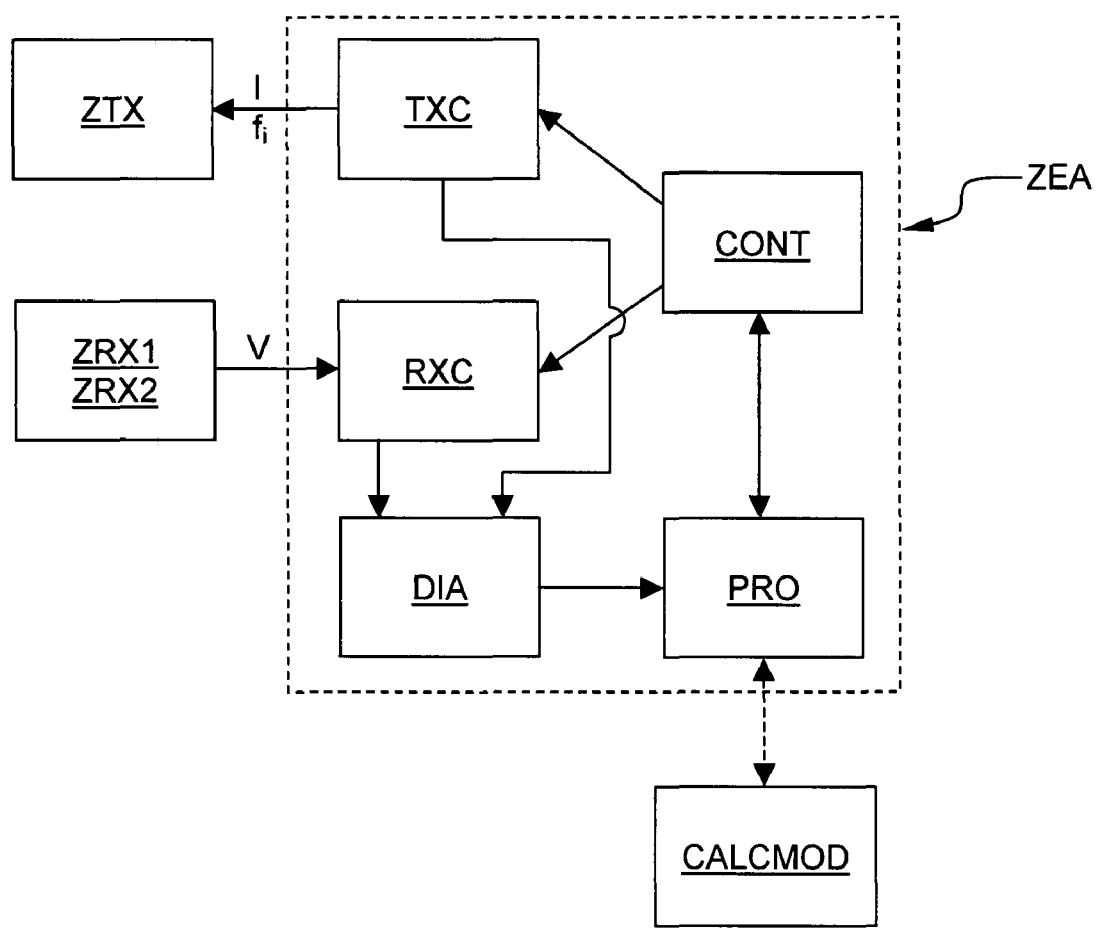
FIG. 6 is a block diagram schematically illustrating in more details one part of the electronic arrangement shown in FIG. 5.

FIG. 6 schematically shows in more details the electronic arrangement part ZEA associated with the first measuring arrangement ZMA. The electronic arrangement part ZEA comprises well known circuit associated with electromagnetic tool, namely a transmitter circuit TXC, a receiver circuit RXC, a controller CONT, a digitizing arrangement DIA and a processing circuit PRO.

The transmitter circuit TXC is connected to the transmitter coil ZTX. The receiver circuit RXC is connected to the receiver coils ZRX1 and ZRX2. Both transmitter TXC and receiver RXC circuit are connected to the controller CONT and to the digitizing arrangement DIA. The processing circuit PRO is connected to the controller CONT and the digitizing arrangement DIA. The processing circuit PRO is further coupled to a calculating module CALCMOD. The calculating module CALCMOD may be comprised in the tool TL or in the surface equipment SE.

The transmitter circuit TXC comprises an appropriate oscillator so that the transmitter coil may be excited by a determined transmitter current I and according to one or a plurality of determined excitation frequency $f_i$. The transmitter coil ZTX generates an electromagnetic field propagating in the inside medium, within the casing and in the outside medium.

The receiver coil ZRX1 or ZRX2 provides a receiver voltage V to the receiver circuit RXC, the receiver voltage being induced by the propagated electromagnetic field. The receiver circuit RXC may comprise appropriate amplifiers and filters for preparing an appropriate signal to be treated by the digitizing arrangement DIA. The digitizing arrangement DIA may comprise appropriate amplifier, filter and digitizer for preparing an appropriate signal to be treated by the processing circuit PRO. The processing circuit PRO may determine a particular physical parameter of the casing.

The other electronic arrangement parts MCEA, DisEA, MonEA or ImEA are similar to the electronic arrangement part ZEA, and will therefore not be further described.

The calculating module CALCMOD implements the method of the invention as hereinafter described. As a first alternative, the calculating module CALCMOD may be comprised in the tool TL. The results may be sent by the calculating module to the surface equipment SE. As a second alternative, the calculating module CALCMOD may be comprised in the surface equipment SE. The raw measurements and/or determined physical parameters may be sent by each electronic arrangement part ZEA, MCEA, DisEA, MonEA or ImEA to the surface equipment SE, the method of the invention being implemented by the processing and computing capabilities of the surface equipment.

The wording "send" used in connection with raw measurements or results has a broad meaning, namely that these data may be transferred from one place to another through wire, radio-transmission, microwave, uploaded to and downloaded from a memory, etc. . . .

All the measurements made by means of the different electromagnetic measuring arrangement ZMA, MCMA, DisMA, MonMA or ImMA are based on the determination of a transimpedance Z which is defined as the mutual impedance between a transmitter coil current I and a receiver coil voltage V of a given transmitter-receiver pair, namely:

$$Z = \frac{V}{I} \tag{1}$$

The measurements are also characterized by one or a plurality of determined excitation frequency $f_i$.

The tool response may be compared to that of a poorly coupled and lossy transformer where the transmitter of the primary circuit induces a voltage in the receiver coil of the secondary circuit. This mutual inductance coupling is composed of flux-coupling through the medium inside the casing and of contributions by the flux passing through the metal and outside of the casing. The electromagnetic field is strongly affected by the eddy-currents inside the metal which flow circumferentially and virtually uninhibited. The magnetic field inside the casing has a dominating axial component. Changes in the properties of the metal, such as the thickness, correspond in changes of the transimpedance Z. If a localized defect or metal-loss is present in the casing, the circumferential eddy-currents are locally perturbed, i.e. required to circumvent the defect. This generates a localized perturbation of the electromagnetic-field which can be used to detect the flaw as long as the sensor is sufficiently close to the defect to traverse the perturbative field.

Preferably, an air-calibration is performed. The calibrated measurement ratio M can be defined as:

$$M = \frac{Z}{Z_{air}} = \frac{V/I}{V_{air}/I_{air}} \qquad (2)$$

The calibrated measurement ratio M is advantageous because the ratio M becomes insensitive to biases due to the measuring arrangement realization. The biases are typically caused by the number of turns in the coils and effect of metallic parts, such as metallic sleeves and the measuring arrangement body. However, the calibrated measurement ratio M does not compensate for variations of the air or casing measurement due to temperature, pressure, and drift in the electronic arrangement. In general, we can decompose the transimpedance Z or the ratio M either into an in-phase (real) component R and an out-of-phase (imaginary) component R or into a real amplitude A and relative phase $\phi$, for instance:

$$Z = \frac{V}{I} = R + iX = A\exp(i\varphi) \qquad (3)$$

The response of the casing to the various sensor geometries and frequencies may be represented through the use of dimensionless variables, namely the casing electromagnetic thickness, and the sensor spacing relative to the casing diameter. The casing electromagnetic thickness is the ratio $d/\delta$ where $\delta$ represents the skin-depth, given by:

$$\delta = \sqrt{\frac{2}{\sigma\mu\omega}} \qquad (4)$$

with the casing magnetic permeability $\mu$ and the casing electrical conductivity $\sigma$ for a transmitter angular frequency of $\omega = 2\pi f_i$.

The sensor spacing relative to the casing diameter is given by:

$$\frac{L}{2a}.$$

Various regimes may be encountered which are depending on the value of the casing electromagnetic thickness and on the value of the sensor spacing relative to the casing diameter. These various regimes will now be briefly described.

A large skin-depth regime occurs for small ratio, namely for:

$$d/\delta \leq 5 \qquad (5)$$

The large skin-depth limit corresponds to the electromagnetic fields penetrating the casing wall thickness and radiating into the medium outside the casing (medium considered to be homogenous). This regime requires sufficiently low excitation frequencies to occur.

A remote field eddy current RFEC regime occurs if the spacing L between the transmitter coil and the receiver coil is sufficiently large, namely for:

$$\frac{L}{2a} \geq 2.5 \qquad (6)$$

In this regime, the phase $\phi$ of the transimpedance measurements becomes nearly a linear function of the casing EM thickness, namely:

$$\varphi = 2\frac{d}{\delta} \qquad (7)$$
$$= 2d\sqrt{\frac{\sigma\mu\omega}{2}}$$

In this regime, the coupling between the transmitter and the receiver inside the casing is sufficiently attenuated so that the transimpedance response becomes dominated by the field which has, firstly, penetrated the casing into the medium outside the casing near the transmitter, secondly, propagated within the medium outside the casing, and finally re-entered across the casing into the medium inside the casing near the receiver. The measurements by a measuring arrangement of the phase $\phi$ are used for an inversion calculation in order to determine the electromagnetic thickness of the casing.

The voltage signal at the receiver is proportional to a complex propagation factor $\exp(ik2d)$, where $k=(1-i)/\delta$. The transimpedance Z is given by:

$$Z = \frac{\exp(-2kd)}{L^3} f\left(\frac{d}{\delta}, \tau, a, L, b_1, b_2\right) \qquad (8)$$

where the dominating exponential has been separated and f is a correction function depending on the geometry of the tool and the casing properties, $b_1$ and $b_2$ are the mean radius of the transmitter coil and the receiver coil, respectively.

In the remote field eddy current RFEC regime, the transimpedance phase measurement is sensitive only to the total metal thickness in the path of the electromagnetic field between the transmitter and the receiver. Thus, such a measurement enables the detection of flaws on the inside and on the outside of a casing in an identical manner and does not enable distinguishing the two flaw types. Once a flaw is detected, its localization on the inside or on the outside of the casing requires a discrimination measurement which will be described in more details hereinafter.

In the case where multiple casings are present, the measurement provides the total electromagnetic thickness. The total electromagnetic thickness includes the contributions from outer metal casings as long as the field which penetrated all layers can be detected with a sufficient signal to noise ratio. The comparisons between logs run at different times enables providing information on gradual metal loss of the combined casings.

A low-frequency near field eddy current LF-NFEC regime occurs if the spacing L between the transmitter coil and the receiver coil is smaller than the remote field eddy current RFEC regime, namely for:

$$\frac{L}{2a} < 1 \quad (9)$$

In this regime, the transimpedance becomes a rather complicated function of the casing thickness, diameter and electromagnetic properties. The functional dependence of the transimpedance measurement on the electromagnetic properties (μ and σ) significantly differs between the remote field eddy current RFEC and the low-frequency near field eddy current LF-NFEC regime. The measurements obtained in these two regimes may be combined to correct the "magnetic anomaly effect" in a joint inversion scheme that will be described in more details hereinafter.

A small skin-depth regime occurs for large ratio, namely for:

$$d/\delta \gg 1 \quad (10)$$

The small skin-depth corresponds to the electromagnetic fields which cannot penetrate far into the casing wall thickness. This regime requires sufficiently high excitation frequencies to occur.

When the transmitter and receiver are centered within the casing, i.e. the coils are coaxial to the axis Ax, the transimpedance may be defined as:

$$Z = Z_0 + Z_P \quad (11)$$

where $Z_0$ is the transimpedance of the medium inside the casing (an homogenous medium) and $Z_P$ is the transimpedance effects due to the casing wall.

The transimpedance $Z_P$ depends significantly on a third real and dimensionless variable τ, defined as:

$$\tau = \frac{1}{\mu_0 \sqrt{\omega}} \frac{1}{ID} \sqrt{\frac{\mu}{\sigma}} \quad (12)$$
$$= \frac{1}{\sqrt{2}} \frac{\mu}{\mu_0} \frac{\delta}{ID}$$

where ID=2a is the inner diameter of the casing and $\mu_0$ is the vacuum permeability inside and outside of the casing. The quantity τ depends on the two unknown quantities, namely the inner diameter ID and the permeability to conductivity ratio μ/σ.

The use of high excitation frequencies leads to a strong attenuation of the receiver signal as a function of the spacing L. Therefore, a high-frequency near-field eddy-current HF-NFEC regime occurs when:

$$\frac{L}{2a} < 1 \quad (13)$$

The measurements in the high-frequency near-field eddy-current HF-NFEC regime are used in order to simultaneously determine, by means of an inversion, the average inner diameter $\langle D \rangle$ and the average permeability to conductivity ratio $\langle \mu/\sigma \rangle$.

The average ratio $\langle \mu/\sigma \rangle$ may be subsequently employed to correct for the magnetic anomaly effect as discussed below. The choice of the frequencies for the high-frequency near-field eddy-current HF-NFEC regime measurements is limited due to the fact that the optimum sensitivity for the quantities $\langle D \rangle$ and $\langle \mu/\sigma \rangle$ are observed near τ=0.2. Furthermore, the choice of L/2a can also be optimized to address a particular range of casing inner diameter ID. Generally, the smaller spacings are favorable to determine small casing inner diameter ID and associated $\langle \mu/\sigma \rangle$ ratio, while larger spacings are favorable to determine large casing inner diameter ID and associated $\langle \mu/\sigma \rangle$ ratio.

The measurements in the high-frequency near-field eddy-current HF-NFEC regime are also used for the discrimination measurements used to distinguish flaws near the inner perimeter of the casing wall from those near the outside perimeter of the casing wall.

The Table 3 is an example indicating the range values of the various dimensionless parameters, namely the electromagnetic thickness d/δ, the sensor spacing relative to the casing diameter L/2a and the third real and dimensionless variable τ for the various measurements performed by the tool. In the following table:

the casing electromagnetic parameters are comprised in the following ranges:

$3.9 \cdot 10^6$ S/m $\leq \sigma \leq 7.4 \cdot 10^6$ S/m and $$20 \leq \frac{\mu}{\mu_0} \leq 200;$$

the casing geometrical parameters are comprised in the following ranges:

0.2 inch $\leq$ d $\leq$ 0.9 inch and 2.4 inch $\leq$ ID $\leq$ 9 inch.

TABLE 3

| Measurement type | performed by | d/δ | L/2a | τ |
|---|---|---|---|---|
| LF-RFEC Average electromagnetic thickness | MCMA | [0.2, 5] | ≧2.5 | [0.5, 10] |
| LF-RFEC High-resolution electromagnetic thickness and flaw imaging | ImMA | [0.2, 5] | ≧2.5 | [0.5, 10] |
| LF-NFEC $\langle \mu/\sigma \rangle$ and $\langle ID \rangle$ | MonMA | [0.2, 5] | <1 | [0.5, 10] |
| HF-NFEC $\langle \mu/\sigma \rangle$ | ZMA | [5, 200] | <1 | [0.02, 1] |
| HF-NFEC $\langle ID \rangle$ | ZMA | [5, 200] | <1 | [0.02, 1] |
| HF-NFEC Discrimination | DisMA | [5, 200] | <1 | [0.02, 1] |

The Table 4 is an example indicating the range values of the excitation frequency and the spacing for the various measurements performed by the tool. The measurements at a low frequency are used for the determination of the average and the high-resolution electromagnetic thickness. An additional measurement at a low frequency is used for the determination of the average electromagnetic properties ratio $\langle \mu/\sigma \rangle$ and of the average casing inner diameter $\langle D \rangle$. The measurements at a high frequency are used for the determination of the average casing inner diameter $\langle D \rangle$ and the average electromagnetic properties ratio $\langle \mu/\sigma \rangle$. Another measurement at a high discrimination frequency is used for distinguishing the flaw locations inside from outside the casing.

TABLE 4

| Measurement type | performed by | Excitation frequency (Hz) | Spacing (inch) |
|---|---|---|---|
| LF-RFEC Average and high-resolution electromagnetic thickness | MCMA and ImMA | $8.75 \leq f_i \leq 70$ | $25 \leq L \leq 40$ |
| LF-NFEC $\langle\mu/\sigma\rangle$ and $\langle ID \rangle$ | MonMA | $8.75 \leq f_i \leq 70$ | $0 \leq L \leq 5$ |
| HF-NFEC $\langle\mu/\sigma\rangle$ and $\langle ID \rangle$ | ZMA | $500 \leq f_i \leq 15.10^3$ | $0 \leq L \leq 5$ |
| HF-NFEC Discrimination | DisMA | $500 \leq f_i \leq 100.10^3$ | $0 \leq L \leq 5$ |

The Table 5 is a preferred example indicating the values of the excitation frequency and of the spacing for the various measurements performed by the tool.

TABLE 5

| Measurement type | Excitation frequencies (Hz) | Spacings (inch) |
|---|---|---|
| LF-RFEC Average electromagnetic thickness | [8.75, 17.5, 35, 70] (selectable) | 30 |
| LF-RFEC High-resolution electromagnetic thickness and flaw imaging | [8.75, 17.5, 35, 70] (selectable) | 33 |
| LF-NFEC $\langle\mu/\sigma\rangle$ and $\langle ID \rangle$ | [8.75, 17.5, 35, 70] (selectable) | 0 |
| HF-NFEC $\langle\mu/\sigma\rangle$ | [600, 1500, 14000] (simultaneous) | [1.5, 4] |
| HF-NFEC $\langle D \rangle$ | [600, 1500, 14000] (simultaneous) | [1.5, 3] |
| HF-NFEC Discrimination | 10000 | 0 |

In this example the low frequency measurements (LF-RFEC and LF-NFEC regimes) are performed according to a single frequency selected from a choice of four, while the high frequency measurements (HF-NFEC regime) performed by the average casing properties measuring arrangement ZMA according to three different frequencies simultaneously. The HF-NFEC discrimination measurement may be performed according to a single excitation frequency (e.g. 10 kHz) or, alternatively, according to multiple frequencies.

The HF-NFEC ratio $\langle\mu/\sigma\rangle$ and inner diameter $\langle D \rangle$ measurements are determined by the average casing properties measuring arrangement ZMA, where the spacings between the transmitter coil ZTX, and the receiver coils ZRX1 and ZRX2 are 1.5 inch and 3 inch, respectively. The two different spacings enables optimizing the sensitivity of the measuring arrangement to a large range of casing inner diameter ID. A short spacing is preferred for small casing inner diameter while a larger spacing is preferred for larger casing inner diameter.

The LF-RFEC average electromagnetic thickness measurements are determined by the average electromagnetic thickness measuring arrangement MCMA. The receiver coil MC may be spaced at a distance of 30 inch from the transmitter coil LFTX such that it is located in or near the plane comprising the pad receiver coils. At this location the MC receiver coil may be used as a reference for the pad receiver coils. The average electromagnetic thickness measuring arrangement MCMA operates according to a single frequency selected from the group of frequencies comprising the frequencies 8.75 Hz, 17.5 Hz, 35 Hz and 70 Hz. The choice of the single frequency enables optimizing the signal-to-noise ratio, the thickness resolution and the axial resolution. For example, a frequency of 35 Hz would typically enable measurements in a single casing, while the lower frequencies would typically enable measurements in a thick casing or in the multi-casings.

The LF-NFEC $\langle\mu/\sigma\rangle$ property measurements are performed by the monitoring measuring arrangement MonMA, where the receiver coils MRX is concentric with the transmitter coil LFTX, corresponding to a spacing of 0 inch.

The HF-NFEC discrimination image measurement (performed by the discriminating measuring arrangement DisMA) and the LF-RFEC high-resolution electromagnetic thickness and flaw imaging measurements (performed by the imaging measuring arrangement ImMA) require coil receivers in close proximity to the inner casing wall. These measurements are performed by the fifth electromagnetic measuring arrangement ImMA. The third transmitter DTX is associated with the HF-NFEC discrimination image measurement (performed by the discriminating measuring arrangement DisMA). The second transmitter LFTX is associated with the high-resolution LF-RFEC EM thickness measurement (performed by the imaging measuring arrangement ImMA).

Figure 7:
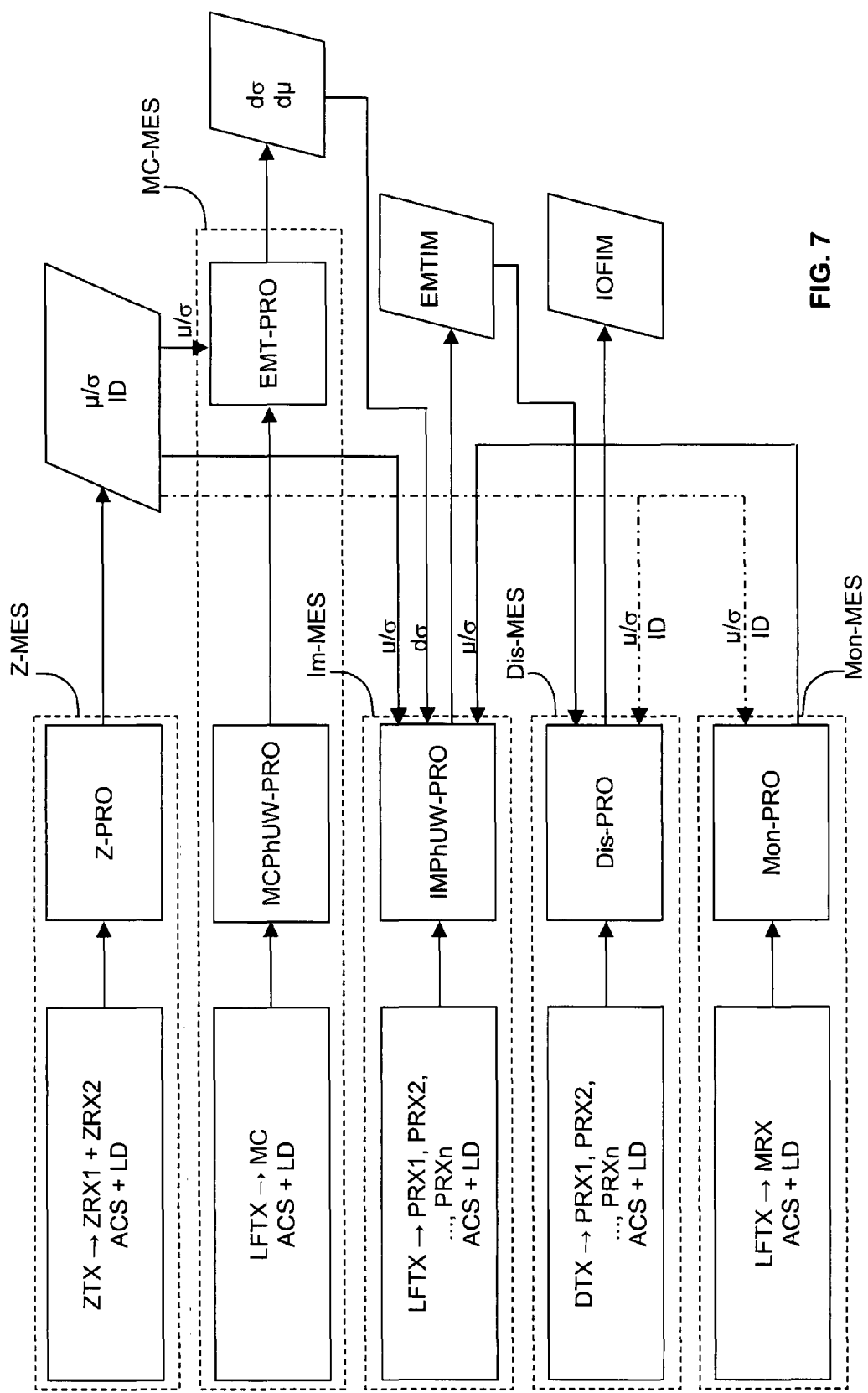
FIG. 7 illustrates the different steps of the electromagnetic imaging method according to the invention.

FIG. 7 illustrates the different steps of the electromagnetic imaging method according to the invention. The electromagnetic imaging method comprises various steps consisting in processing the transimpedance signals derived from the various measuring arrangements of the tool, namely the average casing properties measuring arrangement ZMA, the average electromagnetic thickness measuring arrangement MCMA, the monitoring measuring arrangement MonMA, the imaging measuring arrangement ImMA and the discriminating measuring arrangement DisMA. Generally, the processing consists in processing inversion algorithms.

The Z-coils based measuring step Z-MES is performed by means of the average casing properties measuring arrangement ZMA. The first transmitter ZTX is excited and subsequently the signal at the first ZRX1 and second ZRX2 receiver is measured during a logging step LD. The Z-coils based measuring step Z-MES may comprise a calibration step ACS.

The response of the average casing properties measuring arrangement ZMA depends primarily on the real and dimensionless variable τ for a given casing inner diameter ID. Thus, the average casing properties measuring arrangement ZMA depends on the average inner diameter $\langle D \rangle$ and the average ratio $\langle\mu/\sigma\rangle$ as long as the requirements of the small skin-depth regime are met. The spacings, the transmitter ZTX and receiver ZRX1, ZRX2 coils geometries are designed to optimize the sensitivity of the measuring arrangement to the desired range of casing inner diameter ID.

A table of the transimpedance response is calculated for the entire range of inner diameter ID that may be encountered and for real and dimensionless variable τ for a given transmitter-receiver pair. A function g(ID, τ) representing a calibrated measurement ratio which is suitable for a subsequent inversion is defined such as:

$$g(ID, \tau) = \frac{\text{Im}\left(\frac{V/I}{V_{air}/I_{air}}\right)}{\text{Abs}\left(\frac{V/I}{V_{air}/I_{air}}\right)} \quad (14)$$

FIG. 8 illustrates the modeling results of the calibrated measurement ratio, i.e. the function g(ID, τ) as a function of the real and dimensionless variable τ for various inner diameters ID of the casing (e.g. from inner diameter ID=2.5 inch to ID=9 inch).

Using the measurements $\xi_j$ of this quantity at three suitably chosen frequencies $f_1$, $f_2$ and $f_3$ generates a sampling of g(ID, τ) at three values $\tau_j$ which all scale according to:

$$\tau_j = \tau_{ref}\sqrt{\frac{f_{ref}}{f_j}} \quad (15)$$

where $f_{ref}$ is an arbitrarily chosen reference frequency. As an alternative to the three frequencies, measurements may be performed according to more frequencies or a frequency sweep.

During a processing step Z-PRO, the minimum of the following two-parameter inversion is determined:

$$(\tau_{ref}, ID) = \underset{\tau_{ref}, ID}{\text{Min}}\left\{\left\|\begin{bmatrix}\xi(f_1)\\\xi(f_2)\\\xi(f_3)\end{bmatrix} - \begin{bmatrix}g\left(ID, \tau_{ref}\sqrt{\frac{f_{ref}}{f_1}}\right)\\g\left(ID, \tau_{ref}\sqrt{\frac{f_{ref}}{f_2}}\right)\\g\left(ID, \tau_{ref}\sqrt{\frac{f_{ref}}{f_3}}\right)\end{bmatrix}\right\|^2\right\} \quad (16)$$

The numerical solution to this minimization enables determining the average values of the casing inner diameter ⟨D⟩ and the electromagnetic properties ratio ⟨μ/σ⟩. Two different spacings of the receiver coils are used, i.e. a short spacing for the receiver coil ZRX1 and a long spacing for the receiver coil ZRX2 in order to optimize the sensitivity of the response to small and large pipe inner diameter, respectively. Each receiver-transmitter coil pair is processed in the same way.

The Mon-coils based measuring step Mon-MES (FIG. 7) is performed by means of the monitoring measuring arrangement MonMA. The second transmitter LFTX is excited and subsequently the signal at the fourth receiver MRX is measured during a logging step LD. The Mon-coils based measuring step Mon-MES may comprise a calibration step ACS.

It is known that the measurement of electromagnetic thickness d/δ has to be corrected for variations of the electromagnetic properties. Generally, a given casing grade may have a known electrical conductivity which is nearly constant throughout the casing joint. However, the ferromagnetic casings exhibit widely varying and unknown values of magnetic permeability which also vary locally on a given joint ("magnetic anomaly effect"). As a result the apparent electromagnetic thickness d/δ may exhibit significant variations along a given joint, which could be due to variations of the casing thickness and/or the magnetic permeability. The RFEC type measurements are insufficient to distinguish between one and the other variations. As far as the magnetic permeability μ is concerned, relatively little information is available on the potential frequency dependence μ(ω) or the radial dependence μ(r), i.e. across the casing wall. The monitoring measuring arrangement MonMA performs measurements of the real and dimensionless variable τ and, thus, the electromagnetic properties ratio ⟨μ/σ⟩ at low frequency and large skin depth. This measurement will be compared to the estimation of the electromagnetic properties ratio ⟨μ/σ⟩ performed by the average casing properties measuring arrangement ZMA (as explained hereinbefore).

FIG. 9 illustrates measurement results of the transimpedance (top part) and the phase (bottom part) as a function of the real and dimensionless variable τ for various outer diameters OD of the casing and casing thickness TH pairs performed by the monitoring measuring arrangement MonMA at excitation frequency of 17.5 Hz.

A function $Z_{Mon}$(ID, τ) representing the complex transimpedance which is suitable for a subsequent inversion is defined such as:

$$Z_{Mon}(ID,\tau) = R_{Mon}(ID,\tau) + iX_{Mon}(ID,\tau) \quad (17)$$

The in-phase and out-of-phase measurements ($R\xi_j$, $X\xi_j$) of this quantity are used to generate a sampling of $Z_{Mon}$(ID, τ) at a value $\tau_j$ which scales according to the equation (15). During a processing step Mon-PRO, the minimum of the following two-parameter inversion is determined:

$$(\tau_{ref}, ID) = \underset{\tau_{ref}, ID}{\text{Min}}\left\{\left\|\begin{bmatrix}R\xi(f)\\X\xi(f)\end{bmatrix} - \begin{bmatrix}R_{Mon}\left(ID, \tau_{ref}\sqrt{\frac{f_{ref}}{f}}\right)\\X_{Mon}\left(ID, \tau_{ref}\sqrt{\frac{f_{ref}}{f}}\right)\end{bmatrix}\right\|^2\right\} \quad (18)$$

The numerical solution to this minimization enables determining the average values of the casing inner diameter ⟨D⟩ and the electromagnetic properties ratio ⟨μ/σ⟩.

As a first alternative, the value of the casing inner diameter ⟨D⟩ and/or of the reference real and dimensionless variable $\tau_{ref}$ may be constrained to the proximity of the measurement performed by the average casing properties measuring arrangement ZMA (indicated by a dash-dotted line in FIG. 7). As a second alternative, one of these values may be fixed, for example the casing inner diameter ⟨D⟩, to the average casing properties measuring arrangement ZMA processing result (indicated by a dash-dotted line in FIG. 7). These alternatives enable improving the inversion performed during the processing step Mon-PRO.

The MC-coils based measuring step MC-MES is performed by means of the average electromagnetic thickness measuring arrangement MCMA. The second transmitter coil LFTX is excited and subsequently the signal at the third receiver coil MC is measured during a logging step LD. The DC-coils based measuring step DC-MES may comprise a calibration step ACS. Subsequently, a phase unwrapping processing step MCPhUW-PRO and an average electromagnetic thickness processing step EMT-PRO are performed.

The phase unwrapping processing step MCPhUW-PRO will now be described.

The electromagnetic thickness d/δ appears both in phase and in amplitude of the transimpedance according to the LF-RFEC regime which is dominated by the term exp(ik2d) where k=(1−i)/δ (see equation (8)). Generally, the phase can vary by more than 360° and becomes non-unique on the interval between 0° and 360°. Advantageously, a phase-unwrapping algorithm may be applied before an inversion for determining the electromagnetic thickness. A phase-unwrapping algorithm operates by defining a function depending on the phase S(φ) separating zones of transimpedance amplitudes having the same wrapped phase.

For a given measured transimpedance quantity $|Z|\exp(-i\phi)$ the phase may be wrapped in the interval between 0° and 360°. The algorithm finds an unwrapped phase $\phi'$ by calculating:

$$\varphi' = \begin{cases} \varphi & \text{for } |Z| \leq S(\varphi) \\ \varphi + 360 & \text{for } |Z| > S(\varphi) \end{cases} \quad (19)$$

In a particular implementation of the invention, the algorithm may operate on the calibrated measurement ratio M of equation (2).

The average electromagnetic thickness processing step EMT-PRO will now be described.

This processing step takes into account three measurements, namely the transimpedance phase $\phi_{meas}$ according to the LF-RFEC regime between a transmitter and a receiver, the electromagnetic property factor near the transmitter $\tau_{TX}$, and the electromagnetic property factor near the receiver $\tau_{RX}$. The electromagnetic thickness is approximately given by $$\frac{d_{TX}}{\delta_{TX}} + \frac{d_{RX}}{\delta_{RX}},$$

where the contributions to the measurement near the transmitter and near the receiver due to the double-peaked sensitivity function are explicitly separated. The phase is given by a sum of function evaluated near the transmitter and near the receiver, namely:

$$\varphi_{meas} = w\left(\frac{d_{TX}}{\delta_{TX}}, \tau_{TX}\right) + w\left(\frac{d_{RX}}{\delta_{RX}}, \tau_{RX}\right) \quad (20)$$

The forward model response $$\varphi_{mod}\left(\frac{d}{\delta}, \tau\right)$$

has been calculated for a given uniform electromagnetic thickness $d/\delta$ and fixed real and dimensionless variable $\tau$, i.e.

$$\varphi_{mod}\left(\frac{d}{\delta}, \tau\right) = 2w\left(\frac{d}{\delta}, \tau\right) \quad (21)$$

where the factor 2 indicates that the phase is a measure of the total sum electromagnetic thickness. This function can be inverted at a fixed $\tau$ in order to find:

$$w^{-1}\left(\frac{\varphi_{mod}}{2}, \tau\right) = \frac{d}{\delta}\bigg|_{\tau} \quad (22)$$

The inverse function may be approximated by a linearized function $H(\phi,\tau)$, namely:

$$w^{-1}\left(\frac{\varphi_{mod}}{2}, \tau\right) \approx \frac{1}{2} w^{-1}(\varphi_{mod}, \tau) \equiv \frac{1}{2} H(\varphi_{mod}, \tau) \quad (23)$$

The following average of inversion functions may then be calculated using the three hereinbefore mentioned measurements, i.e.:

$$\frac{1}{2}\left[\begin{array}{c} H(\varphi_{mod}, \tau_{TX}) + \\ H(\varphi_{meas}, \tau_{RX}) \end{array}\right] = \frac{d_{TX}}{\delta_{TX}} + \frac{d_{RX}}{\delta_{RX}} \quad (24)$$

to obtain an approximate solution for the total sum electromagnetic thickness.

The electromagnetic property factor near the transmitter $\tau_{TX}$ and the electromagnetic property factor near the receiver $\tau_{RX}$ may either be determined by means of the monitor measuring arrangement MonMA according to the LF-NFEC regime or by means of the average casing properties measuring arrangement ZMA according to the HF-NFEC regime.

The solution may be exact for uncorrelated variables $d/\delta$ and $\tau$, if the total phase may be we approximated by:

$$\varphi_{meas} = \frac{d_{TX}}{\delta_{TX}} + \frac{d_{RX}}{\delta_{RX}} + u(\tau_{TX}) + u(\tau_{RX}) \quad (25)$$

where $u(\tau)$ is a function independent of $d/\delta$.

The forward model of the response $$\varphi_{mod}\left(\frac{d}{\delta}, \tau\right)$$

for a uniform electromagnetic thickness $d/\delta$ and a fixed $\tau$ is:

$$\varphi_{mod}\left(\frac{d}{\delta}, \tau\right) = 2\frac{d}{\delta} + 2 \cdot u(\tau) \quad (26)$$

This function may be numerically inverted in order to find:

$$2\frac{d}{\delta} = H(\varphi_{mod}, \tau) \quad (27)$$

which according to equation (26) is $$H(\varphi_{mod}, \tau) = \varphi_{mod} - 2 \cdot u(\tau) \quad (28)$$

By calculating the average of:

$$\frac{1}{2}[H(\varphi_{meas}, \tau_{TX}) + H(\varphi_{meas}, \tau_{RX})] = \frac{1}{2}[(\varphi_{meas} - 2 \cdot u(\tau_{TX})) + \quad (29)$$
$$(\varphi_{meas} - 2 \cdot u(\tau_{RX}))]$$
$$= \varphi_{meas} - u(\tau_{TX}) - u(\tau_{RX})$$
$$= \frac{d_{TX}}{\delta_{TX}} + \frac{d_{RX}}{\delta_{RX}}$$

the desired result may be obtained exactly.

Finally, it is useful to calculate the sigma-corrected EM thickness quantity (i.e. independent of sigma), namely: a normalized thickness mu product:

$$d\mu = \frac{\varphi_{corr}}{\sqrt{2\omega}} \sqrt{\frac{\mu}{\sigma}} \quad (30)$$

and a normalized thickness sigma product which is an equivalent mu-corrected quantity (i.e. independent of mu):

$$d\sigma = \frac{\varphi_{corr}}{2\omega} \sqrt{\frac{\sigma}{\mu}} \quad (31)$$

where the quantity $\phi_{corr}$ represents the transimpedance phase measurement $$\frac{d_{TX}}{\delta_{TX}} + \frac{d_{RX}}{\delta_{RX}}$$

inverted in equation (25).

The electromagnetic thickness imaging Im-MES is performed by means of the imaging measuring arrangement ImMA. The second transmitter LFTX is excited and subsequently the signals at the plurality of pad receiver coils PRX1, PRX2, PRX3, PRX4, PRX5, PRX6, PRX7, PRX8, PRX9, PRX10, PRX11, PRX12, PRX13, PRX14, PRX15, PRX16, PRX17 and PRX18 are measured during a logging step LD. The imaging measurement IM-MES may comprise a calibration step ACS. The electromagnetic thickness imaging Im-MES enables forming a first image EMTIM of a local electromagnetic thickness of the pipe and the pipe local defects.

The electromagnetic thickness imaging step Im-MES will now be described in more details.

The phase measurement of the transimpedance by each pad receiver coil is a locally resolved measure of the electromagnetic thickness in the LF-RFEC regime.

Advantageously, using a reference magnetic field enables obtaining a robust imaging measurement, i.e. without ghost images due to the double-peaked sensitivity function. The reference impedance $Z_{ref}$ measurement can be done by using the third receiver coil MC.

A phase low frequency image PLI is defined as:

$$PLI = \text{angle}\left(\frac{Z_{Pi}}{Z_{ref}}\right) \quad (32)$$

where the function angle is defined as the phase of its complex argument.

Alternatively, the reference impedance may be the average of all pad receiver coils impedance measurements $Z_{ref} = \langle Z_P \rangle$.

The phase low frequency image PLI is proportional to the difference between the phase measurement of electromagnetic thickness measurement at the mandrel supporting the third receiver coil and the phase measurement of the pad receiver coils. The phase low frequency image PLI is thus an imaging measurement for the local metal loss.

An appropriate deconvolution of the third receiver coil phase response of $Z_{ref}$ may be necessary in order to suppress processing artifacts. Such processing artifacts may arise due to the difference in the geometrical sensitivity function between the third receiver coil and the pad receiver coils.

Correction of the image phase due to the real and dimensionless variable $\tau$ (magnetic anomalies) is generally required. This correction may be performed using the average ratio $\langle \mu/\sigma \rangle$ determined by the average casing properties measuring arrangement ZMA or by using the average $\langle \mu/\sigma \rangle$ determined by the average casing properties measuring arrangement MON-PRO.

The discrimination measurement Dis-MES is performed by means of the discrimination measuring arrangement DisMA. The third transmitter DTX is excited and subsequently the signals at the plurality of pad receiver coil PRX1, PRX2, PRX3, PRX4, PRX5, PRX6, PRX7, PRX8, PRX9, PRX10, PRX11, PRX12, PRX13, PRX14, PRX15, PRX16, PRX17 and PRX18 are measured during a logging step LD.

The discrimination measurement Dis-MES may comprise a calibration step ACS. The discrimination measurement Dis-MES enables forming a corrected first image IOFIM of the pipe taking into account the position of the local defects.

The discrimination processing Dis-PRO will now be described in more details.

The low frequency phase measurements according to the RFEC regime are sensitive to the remaining metal thickness and only to a small extent to the distance from the defects to the pad receiver coils PRX1, PRX2, ..., PRX18. Thus, these measurements do not enable discriminating the defects position with respect to the casing wall.

The discrimination processing enables distinguishing the defects or flaws located at the casing inner diameter ID from those on the casing outer diameter OD. The operating frequency DF of the third transmitter coil DTX should be chosen such that the electromagnetic field is sufficiently attenuated through the casing thickness. The range of frequencies is limited to $d/\delta \gg 1$ and may practically encompass the range between 500 Hz and 100 kHz.

As an alternative to this excitation scheme, small transmitters may be positioned inside each pad, in an adjacent position to each pad receiver coil.

When, the pad receiver coils receive the low frequency excitation signal (imaging measurement of the imaging step Im-MES) and the high frequency excitation signal (discrimination measurement Dis-MES) simultaneously, a subsequent filtering and demodulation separates the two frequency components.

A correlation function may be introduced, namely:

$$\text{Corr} = \int_{z_0 - \Delta z/2}^{z_0 + \Delta z/2} dx \, \text{angle}\left(\frac{Z_{Pi}}{Z_{ref}}\right)[x] \, \text{angle} \, (Z_{DF})[x] \quad (33)$$

The correlation function is introduced between the normalized pad coil receivers phase response angle $(Z_{Pi}/Z_{ref})$ according to the LF-RFEC regime and the discrimination phase response angle $(Z_{DF})$. Advantageously, both responses are unwrapped to avoid the appearance of artifacts. The integration around a given logging point $z_0$ is performed over a suitably chosen logging interval $\Delta z$ corresponding to the geometrical sensitivity range of the pad coil receivers. The quantity Corr peaks near the defects which are located at the inside of the casing. By employing a threshold criterion, namely:

$$\text{Corr} \begin{cases} > c_0 & \text{defect is inside} \\ \leq c_0 & \text{defect not inside} \end{cases} \quad (34)$$

it enables making a qualitative discrimination between inner defects and outer defects.

Figure 10:
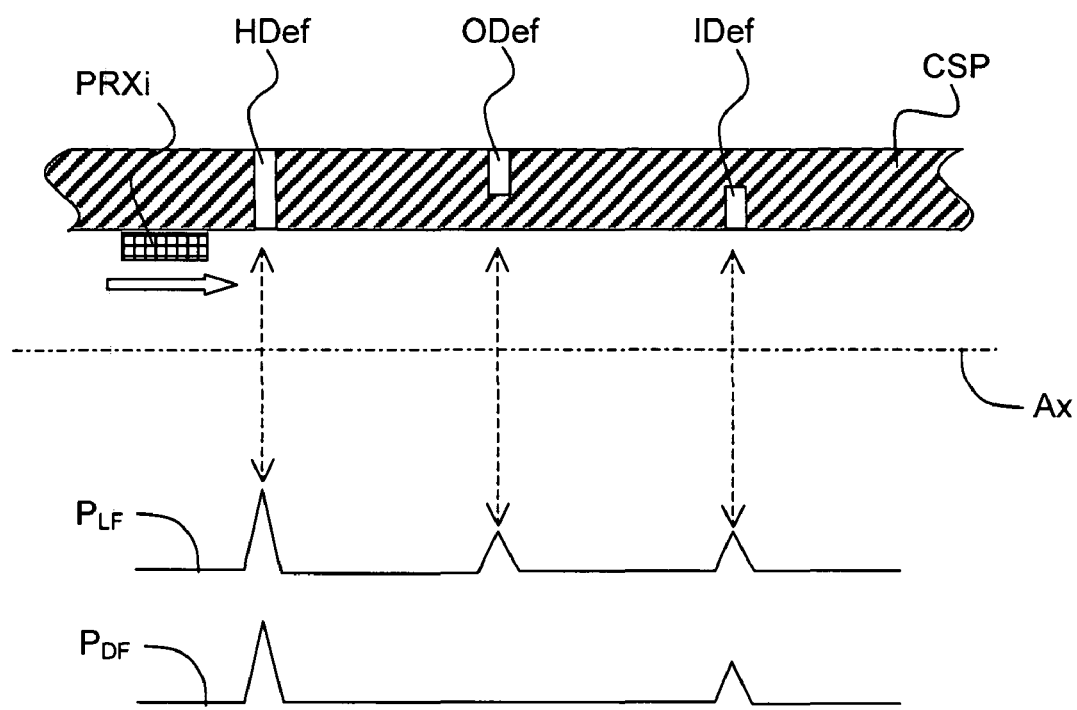
FIG. 10 schematically illustrates, from top to bottom, a cross section into a casing portion showing a plurality of defects, the LF phase response (low excitation frequency) and the DF phase response (high excitation frequency) measured with the pad receiver coils and associated with the plurality of flaws, respectively.

The outer defects which nearly penetrate the casing wall will influence also the discrimination measurement at the high frequency. Thus, the threshold $c_0$ is related to the accuracy with which a deep outer defect may be distinguished from a through-hole. FIG. 10 schematically illustrates, from top to bottom, a cross section into a casing portion CSP showing a plurality of defect HDef, ODef and IDef, the low excitation frequency phase response ($P_{LF}$) and the high excitation frequency phase response ($P_{DF}$) measured with the pad receiver coils PRXi and associated with a plurality of defect types, respectively. FIG. 10 shows various defect type, namely a hole defect (left part of the casing CS), an outer defect (middle part of the casing CS) and an inner defect (right part of the casing CS).

The response of a pad receiver coil at a high frequency $P_{DF}$ is insensitive to external defects of the metal casing CS, namely the outer defect ODef. To the contrary, the response of a pad receiver coil at a low frequency $P_{LF}$ corresponding to a RFEC regime enables detecting both internal and external defects.

It may be advantageous to include the average ratio $\langle\mu/\sigma\rangle$ and inner diameter ID determined by the average casing properties measuring arrangement ZMA or the average ratio $\langle\mu/\sigma\rangle$ determined by the average casing properties measuring arrangement MON-PRO in the quantitative discrimination measurement Dis-MES processing. This enables distinguishing an outer defect from a through-hole.

Alternatively, it may be advantageous to combine the average ratio $\langle\mu/\sigma\rangle$ and inner diameter ID determined by the average casing properties measuring arrangement ZMA with pad receiver coil signals of the discriminating measuring arrangement DisMA in order to perform a joint inversion for calculating a local electromagnetic property ratio $\langle\mu/\sigma\rangle$ image. This processing may be used to enhance the accuracy of a quantitative discriminating measurement Dis-MES processing. This enables distinguishing an outer defect from a through-hole. Additionally, this local electromagnetic property ratio $\langle\mu/\sigma\rangle$ image may be used to enhance the local electromagnetic thickness image processing IM by providing a local property corrected image.

Furthermore, it may be advantageous to exploit the dependence of the pad receiver coils PRX1, PRX2, . . . , PRX18 signals on the radial distance from the third transmitter DTX for calculating a local casing radius image.

FINAL REMARKS

Though, a particular example of centralizer comprising eighteen pad receiver coils has been shown and described, it will be apparent to a person skilled in the art that the invention is not limited to this particular number. The electromagnetic imaging device of the invention may comprise more or less pad receiver coils.

A particular application of the invention relating to applications in the oilfield industry has been described. However, the invention is also applicable to other type of industry where inspection of a pipe is of interest, for example utility industry, chemical industry, etc. . . .

In the hereinbefore description, the transimpedance between a transmitter coil and a separate receiver coil has been measured. However, it will be apparent for a person skilled in the art that the invention is also applicable to the measurement of the impedance of a single coil.

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. An electromagnetic imaging method for electromagnetically measuring physical parameters of a pipe (CJ, CC) by means of a plurality of measuring arrangement (ZMA, MCMA, MonMa, ImMA) comprising a plurality of transmitter coil (ZTX, LFTX, DTX) and a plurality of receiver coil (ZRX1, ZR2, MRX, MC, PRX1, PRX2, PRX3, PRX4, PRX5, PRX6, PRX7, PRX8, PRX9, PRX10, PRX11, PRX12, PRX13, PRX14, PRX15, PRX16, PRX17, PRX18), the transmitter coils and receiver coils being associated so as to form the plurality of measuring arrangement, the plurality of measuring arrangement being adapted to be positioned into the pipe and displaced through the pipe, the physical parameters being measured for a plurality of position along the pipe, the method comprising the steps of:

a) determining a first value of an average ratio of magnetic permeability to electrical conductivity and a first value of an average inner diameter of the pipe (Z-MES), b) determining an average electromagnetic thickness of the pipe (MC-MES), c) determining a second value of the average ratio of magnetic permeability to electrical conductivity and a second value of the average inner diameter of the pipe (Mon-MES) according to excitation frequencies which are substantially lower than the excitation frequencies used to determine the first values (Z-MES), d) determining a first image (EMTIM) of a local electromagnetic thickness of the pipe and the pipe local defects (Im-MES), e) discriminating the local defects at an inside perimeter of the pipe from the local defects at an outside perimeter of the pipe (Dis-MES), and f) forming a corrected first image (IOFIM) of the pipe taking into account a position of the local defects.

2. An electromagnetic imaging method according to claim 1, wherein the method comprising the steps of:

a) forming an average casing properties measuring arrangement (ZMA) by:

exciting a transmitter coil of the average casing properties measuring arrangement (ZMA) according to a first set of excitation frequency comprising at least two excitation frequencies, determining at least a first transimpedance between the transmitter coil and a receiver coil of the average casing properties measuring arrangement (ZMA), calculating an average ratio of magnetic permeability to electrical conductivity and an average inner diameter of the pipe, b) forming an average electromagnetic thickness measuring arrangement (MCMA) by:

exciting a transmitter coil of the average electromagnetic thickness measuring arrangement (MCMA) according to a second excitation frequency, determining a second transimpedance between the transmitter coil and a receiver coil of the average electromagnetic thickness measuring arrangement (MCMA), calculating an average electromagnetic thickness of the pipe, c) forming a monitoring measuring arrangement (MonMA) by:

exciting a transmitter coil of the monitoring measuring arrangement (MonMA) according to a third excitation frequency, determining a third transimpedance between the transmitter coil and a receiver coil of the monitoring measuring arrangement (MonMA), calculating another value of an average ratio of magnetic permeability to electrical conductivity of the pipe and another value of an average inner diameter of the pipe, d) forming an imaging measuring arrangement (ImMA) by:
   exciting a transmitter coil of the imaging measuring arrangement (ImMA) according to a fourth excitation frequency,
   determining a plurality of transimpedance between the transmitter coil and a plurality of pad receiver coil of the imaging measuring arrangement (ImMA),
   processing a first image (EMTIM) of the local electromagnetic thickness of the pipe and the local defects of the pipe,
e) forming a discriminating measuring arrangement (DisMA) by:
   exciting a transmitter coil of the discriminating measuring arrangement (DisMA) according to a fifth excitation frequency,
   determining a plurality of transimpedance between the transmitter coil and a plurality of pad receiver coil of the discriminating measuring arrangement (DisMA),
   discriminating the local defects at an inside perimeter of the pipe from the local defects at an outside perimeter of the pipe,
   processing a second image of the local ratio of magnetic permeability to electrical conductivity and a third image of the local radius of the pipe, and
   processing a corrected first image (IOFIM) of the pipe electromagnetic thickness with a correction for local electromagnetic anomalies and the discriminated local defects of the pipe.

3. An electromagnetic imaging method according to claim 1, wherein the method further comprises the steps of determining a second image of a local ratio of magnetic permeability to electrical conductivity and a third image of a local radius of the pipe.

4. An electromagnetic imaging method according to claim 2, wherein the first set of excitation frequencies and the fifth excitation frequency are chosen in a first range of frequencies, the second, third and fourth excitation frequencies are chosen in a second range of frequencies, the first range of frequencies being substantially higher than the second range of frequencies.

5. An electromagnetic imaging method according to claim 1, wherein:
   the first range of frequencies is bounded between a first minimum frequency and a first maximum frequency, the first minimum frequency corresponding to satisfying the joint condition of a ratio of the pipe thickness to the pipe skin depth of 5 and a parameter tau of 1 and the first maximum frequency corresponding to satisfying the joint condition of the ratio of the pipe thickness to the pipe skin depth of 200 and the parameter tau of 0.02,
   the second, third and fourth excitation frequencies are chosen in a second range of frequencies bounded between a second minimum frequency and a second maximum frequency, the second minimum frequency corresponding to the ratio of the pipe thickness to the pipe skin depth of 0.2 and the second maximum frequency corresponding to the ratio of the pipe thickness to the pipe skin depth of 5.

6. An electromagnetic imaging method according to claim 1, wherein the second and third excitation frequencies are the same.

7. An electromagnetic imaging method according to claim 1, wherein the method further comprises the step of performing an air-calibration (ACS).

8. An electromagnetic imaging method according to claim 1, wherein a first spacing between the transmitter (LFTX) and the receiver (MC) of the average electromagnetic thickness measuring arrangement (MCMA), a second spacing between the transmitter (LFTX) and any of the pad receiver (PRXi) of the imaging measuring arrangement (ImMA) is chosen so that a low frequency remote field eddy current regime (LF-RFEC) occurs.

9. An electromagnetic imaging method according to claim 1, wherein a third spacing between the transmitter (LFTX) and the receiver (MRX) of the monitoring measuring arrangement (MonMA) is chosen so that a low frequency near field eddy current regime (LF-NFEC) occurs.

10. An electromagnetic imaging method according to claim 1, wherein a fourth spacing between the transmitter (ZTX) and the receiver (ZRX1, ZRX2) of the average casing properties measuring arrangement (ZMA) and a fifth spacing between the transmitter (LFTX) and any of the pad receiver (PRXi) of the discriminating measuring arrangement (DisMA) is chosen so that a high frequency near field eddy current regime (HF-NFEC) occurs.

11. An electromagnetic imaging method according to claim 1, wherein a spacing between the transmitter coil and the receiver coil is chosen so as to optimize the sensitivity to the pipe inner diameter.

12. A non-transitory computer program product for an electromagnetic imaging device, the electromagnetic imaging device comprises a plurality of measuring arrangement, each measuring arrangement comprising a transmitter coil and at least one receiver coil, the measuring arrangement being adapted to be positioned into the pipe and displaced through the pipe, the receiver coil providing a receiver voltage when the transmitter coil is excited by means of a transmitter current according to at least one excitation frequencies, the computer program product comprising a set of instructions that, when loaded into a program memory of a main electronic arrangement coupled to the measuring arrangement, causes the main electronic arrangement to carry out the steps of the electromagnetic imaging method according to claim 1.

13. An electromagnetic imaging device for electromagnetically measuring physical parameters of a pipe, the electromagnetic imaging device being adapted to be positioned into the pipe, displaced through the pipe and coupled to a surface equipment,
   wherein the electromagnetic imaging device comprises an average electromagnetic thickness measuring arrangement (MCMA), an imaging measuring arrangement (ImMA), a monitoring measuring arrangement (MonMA), an average casing properties measuring arrangement (ZMA) and discriminating measuring arrangement (DisMA), each measuring arrangement comprising a transmitter coil and at least one receiver coil, each measuring arrangement being coupled to an electronic arrangement (ZEA, MCEA, MonEA, ImEA, DisEA) comprising a transmitter circuit for exciting the transmitter coil by means of a transmitter current according to a plurality of excitation frequencies, and a receiver circuit for measuring a receiver voltage at the receiver coil, wherein each electronic arrangement is further coupled to a calculating module (CALCMOD) for:
      determining a first value of an average ratio of magnetic permeability to electrical conductivity and a first value of an average inner diameter of the pipe,
      determining a value of an average electromagnetic thickness of the pipe,
      determining a second value of the average ratio of magnetic permeability to electrical conductivity and a second value of the average inner diameter of the pipe according to excitation frequencies which are substantially lower than the excitation frequencies used to determine the first values, determining a first image (EMTIM) of a local electromagnetic thickness of the pipe and the pipe local defects, discriminating the local defects at an inside perimeter of the pipe from the local defects at an outside perimeter of the pipe, and forming a corrected first image (IOFIM) of the pipe taking into account a position of the local defects.

14. An electromagnetic imaging device according to claim 13, wherein the electromagnetic imaging device comprises:

a plurality of transmitter coil (ZTX, LFTX, DTX) and a plurality of receiver coil (ZRX1, ZRX2, MC) positioned on a body of the electromagnetic imaging device, and a plurality of pad receiver coil (PRXi), each pad receiver coil being positioned on an arm of a centralizer deployable against a pipe wall.

15. An electromagnetic imaging device according to claim 13, wherein each transmitter coil (ZTX, LFTX, DTX) and receiver coil (ZRX1, ZRX2, MC) comprises a wire wound-up on a body (TLB), the wound-up wire defining empty spaces impregnated with an oil, the oil being held in place by an over-molding material, a protection sleeve being over-molded on the wind-up wire and the over-molding material.

16. An electromagnetic imaging device according to claim 13, wherein each pad receiver coil (PRXi) comprises a wire wound-up on an insert made of a high magnetic permeability material, the wound-up wire defining empty spaces impregnated with an oil, the oil being held in place by an over-molding material, a protection sleeve being over-molded on the wind-up wire and the over-molding material.

17. An electromagnetic imaging device according to claim 15, wherein the oil is a perfluoropolyether oil, the over-molding material is a mixture of perfluoropolyether with terminal silicon cross-linking groups, and the protection sleeve is made of semi-crystalline thermoplastic polyetheretherketone PEEK, or a plastic or a rubber material.

18. An electromagnetic imaging device according to claim 13, wherein the plurality of electronic arrangement (ZEA, MCEA, MonEA, ImEA, DisEA) are positioned within the body (TLB) of the electromagnetic imaging device, the transmitter or receiver coil being coupled to the electronic arrangement by a cable (CB) crossing the body via a feed-through connector, the cable being sealed to the feed-through connector by a crimped area.

* * * * *